(12) United States Patent
Park et al.

(10) Patent No.: US 8,054,414 B2
(45) Date of Patent: Nov. 8, 2011

(54) LIQUID CRYSTAL DISPLAY DEVICE

(75) Inventors: Chi Hyuck Park, Daegu-si (KR); Seung Hee Lee, Jeonju-si (KR)

(73) Assignee: LG Display Co., Ltd., Seoul (KR)

( * ) Notice: Subject to any disclaimer, the term of this patent is extended or adjusted under 35 U.S.C. 154(b) by 951 days.

(21) Appl. No.: 11/642,629

(22) Filed: Dec. 21, 2006

(65) Prior Publication Data
US 2008/0002105 A1    Jan. 3, 2008

(30) Foreign Application Priority Data

Jun. 30, 2006 (KR) .................. 10-2006-0060342

(51) Int. Cl.
*G02F 1/1335* (2006.01)

(52) U.S. Cl. ............. 349/95; 349/61; 349/62; 349/63; 349/64; 349/65; 349/66; 349/67; 349/68; 349/69; 349/70; 349/71

(58) Field of Classification Search .............. None
See application file for complete search history.

(56) References Cited

U.S. PATENT DOCUMENTS

| | | | |
|---|---|---|---|
| 5,462,226 A * | 10/1995 | Randall et al. | 236/93 R |
| 5,592,332 A * | 1/1997 | Nishio et al. | 359/619 |
| 6,002,464 A | 12/1999 | Fujisawa et al. | |
| 6,609,799 B1 * | 8/2003 | Myers | 359/613 |
| 6,822,707 B2 * | 11/2004 | Ariyoshi et al. | 349/112 |
| 6,829,087 B2 * | 12/2004 | Freese et al. | 359/455 |
| 7,339,638 B2 * | 3/2008 | Kitamura | 349/95 |
| 2001/0017674 A1 * | 8/2001 | Yamaguchi | 349/61 |
| 2002/0130990 A1 * | 9/2002 | Nakamura | 349/95 |
| 2005/0185115 A1 * | 8/2005 | Yee et al. | 349/95 |
| 2005/0243551 A1 * | 11/2005 | Onishi et al. | 362/244 |
| 2006/0215078 A1 * | 9/2006 | Kawakami | 349/95 |
| 2007/0223089 A1 * | 9/2007 | Hirata et al. | 359/457 |

FOREIGN PATENT DOCUMENTS

| | | |
|---|---|---|
| EP | 0640850 A2 | 3/1995 |
| JP | 5-333328 A | 12/1993 |
| JP | 8-190090 A | 7/1996 |
| JP | 2002-107706 A | 4/2002 |
| WO | WO-03/050448 A1 | 6/2003 |

* cited by examiner

*Primary Examiner* — Thanh-Nhan Nguyen
(74) *Attorney, Agent, or Firm* — Birch, Stewart, Kolasch & Birch, LLP

(57) ABSTRACT

A liquid crystal display (LCD) device including upper and lower substrates facing each other with a liquid crystal layer interposed therebetween, upper and lower polarization plates positioned on outer surfaces of the upper and lower substrates, respectively, and a beam steering film positioned on the upper polarization plate and including a plurality of curved-lenses formed on a surface of the beam steering film facing the upper polarization plate.

11 Claims, 28 Drawing Sheets

Upper and lower viewing angles $d\Delta n_\perp = d\Delta n_1 = d\Delta n_2$
< OFF >

$d\Delta n_\perp \neq d\Delta n_1 \neq d\Delta n_2$
< ON >

First domain | Second domain

First domain | Second domain

──▶ : Direction of primary viewing angle in each domain
───▶ : Rubbing direction of upper substrate
----▶ : Rubbing direction of lower substrate $dΔn_⊥ ≒ dΔn_1 ≒ dΔn_2$ ⎯⎯⎯▶ : Direction of primary viewing angle in each domain
⎯⎯▶ : Rubbing direction of upper substrate
----▶ : Rubbing direction of lower substrate $d\Delta n_\perp \approx d\Delta n_1 \approx d\Delta n_2$

LIQUID CRYSTAL DISPLAY DEVICE

This application claims the benefit of Korean Patent Application No. 10-2006-0060342, filed on Jun. 30, 2006, which is hereby incorporated by reference as if fully set forth herein.

BACKGROUND OF THE INVENTION

1. Field of the Invention

The present invention relates to a liquid crystal display device, and more particularly to a liquid crystal display device having a multi-domain structure implemented with a beam steering film.

2. Discussion of the Related Art

Research has been conducted on various planar panel display devices such as a liquid crystal display (LCD) device, a plasma display panel (PDP), an electroluminescent display device (ELD) and a vacuum fluorescent display device (VFD). Of these devices, the LCD device is used mostly in mobile image display devices such as a notebook computer, because the LCD device has excellent image quality characteristics, is light weight and compact, and has low power consumption characteristics. In addition, the LCD device is also used as a TV monitor or Computer monitor.

In addition, the LCD device displays an image by adjusting the birefringence of a liquid crystal layer interposed between two polarization plates, and by changing the transmittance according to the birefringence. Further, the LCD device is designed to provide an optimal condition with respect to light transmitted in a normal direction of a screen. Thus, the LCD device does not provide an optimal viewing condition when looking at the LCD device from a skewed viewing angle.

In addition, commercialized LCD modes including a twisted nematic (TN) mode, an in-plane switching (IPS) mode, a multi-domain vertical alignment (MVA) mode, an optically compensated bend (OCB) mode, a fringe-field switching (FFS) mode and an electrically controlled birefringence (ECB) mode use rod-like liquid crystals. However, the viewing condition at an angle is even worse for rod-like crystals because of an asymmetry of the birefringence. The poor viewing condition includes a deterioration in contrast and luminance, a color shift, a gray inversion phenomenon, etc.

Turning now to FIGS. 1A and 1B, which are overviews illustrating a concept of the above-mentioned TN mode. As shown in FIG. 1A, the liquid crystals in the TN mode are maintained horizontal to an alignment layer when the power is turned off. Then, as shown in FIG. 1B, when the power is turned on, the liquid crystals around the center of the liquid crystal layer are aligned vertical to the alignment layer in response to an electric field. In addition, a TFT LCD device includes a normally white mode, which is a display mode using an Off-state as white and an On-state as black.

Also, even though the LCD is advantageous because it has a high transmittance and is easy to produce, the TN mode is disadvantageous because of the gray inversion phenomenon that occurs at upper and lower viewing angles. In more detail, the gray inversion phenomenon is a phenomenon where an image looks brighter at a darker gray scale than at a brighter gray scale. In the TN mode, the gray inversion phenomenon makes an image look bright at an upper viewing angle and look dark at a lower viewing angle.

Further, the gray inversion phenomenon is worse at a lower viewing angle, which deteriorates a screen quality of the TN mode LCD and also limits the utility of the TN mode LCD. FIG. 2 is a graph illustrating the gray inversion phenomenon according to upper and lower viewing angles of the TN mode LCD device. Also, the most significant cause of the gray inversion phenomenon is a variation in refractivity according to the viewing angles.

In more detail, and as shown in FIGS. 3A and 3B, the TN mode exhibits a small variation ($d\Delta n\perp \approx d\Delta n1 \approx d\Delta n2$) of the refractivity according to the viewing angles in the Off-state, and a significant variation ($d\Delta n\perp \neq d\Delta n1 \neq d\Delta n2$) of the refractivity according to the viewing angles in the On-state. The variation occurs because in the On-state an average director of the liquid crystals is slanted in the upper and lower directions, causing the light passing through the liquid crystals to experience an actual birefringence property (effective $d\Delta n$) which changes according to the viewing angles. Further, this phenomenon is more significant in the upper and lower directions.

In more detail, and as shown in FIG. 4, $d\Delta n$ of a dark gray scale becomes greater than $d\Delta n$ of a bright gray scale at a lower viewing angle below an apex where $\Delta n$ of the average director of the liquid crystals theoretically becomes zero (0). Further, $d\Delta n$ of the dark gray scale becomes greater than $d\Delta n$ of the bright gray scale at an upper viewing angle above an apex where $\Delta n$ of the average director theoretically becomes the maximum value. This phenomenon is exhibited as a gray inversion on a screen of a liquid crystal panel. In addition, the reference numerals 30 and 31 indicate upper and lower substrates, respectively, and the reference numeral 40 indicates a liquid crystal panel in FIGS. 3A to 4.

One method to overcome the gray inversion phenomenon is to dispose two or more domains of liquid crystals in a single pixel with a primary viewing angle of the liquid crystals of one domain being directed opposite to that of the liquid crystals of the other domain, thereby compensating the domains with each other. This method uses the counterbalancing asymmetry of the viewing angles so the asymmetric viewing angles are provided in opposite directions.

For example, FIGS. 5A, 5B and 6 illustrate multiple domains in the TN mode LCD device. As shown in FIGS. 5A, 5B and 6, a user senses a mixed light passing through a first domain and a second domain. In other words, because the user senses an average value of $d\Delta n$ of the first domain and $d\Delta n$ of the second domain, it is possible to compensate the optical asymmetry. Further, the reference numerals 50 and 51 in FIGS. 5A, 5B and 6 correspond to upper and lower substrates.

Thus, in the TN mode, a multi-domain including two domains in the upper and lower directions is mainly effective, because the asymmetry of the viewing angles occurs mainly in the upper and lower directions. Further, the asymmetry of the viewing angels and the gray inversion phenomenon are less in the right and left directions compared with the upper and lower directions because of a self compensation of the TN mode and a wide viewing angle in the right and left directions.

Further, as shown in FIG. 7, when using four domains (first to fourth domains) in upper, lower, right and left directions, one would expect to have an even more uniform improvement of the viewing angles in the four directions than the multi-domain effect in the right and left directions. However, the multi-domain has not been commercialized because a rubbing process must be performed differently for each domain. Furthermore, a wide view film used to widening the viewing angle cannot be applied to the TN mode.

In addition, the VA mode is used as a wide viewing angle mode to thereby solve the problem related to the viewing angle using the multi-domain. However, even in a four domain VA mode such as a multi-domain vertical alignment (MVA), a pattern-domain vertical alignment (PVA), etc, the viewing angle characteristic is not perfect. In particular, FIG.

8 illustrates that for a VA mode LCD, the gray characteristics are changed according to the viewing angles such that a gray scale in the front side is different from a gray scale at a skewed angle.

A pixel division driving method (S-PVA) has been suggested to improve this problem, but the method still does not completely solve the problem. In addition, as shown in FIGS. 9A and 9B, the optical characteristics at a skewed angle are also significantly deteriorated compared to the front side in terms of luminance and contrast of the MVA.

In addition, the IPS mode and the FFS mode exhibit the best viewing angle characteristics among the modes used in commercialized LCD devices, and thus exhibit the least variation in optical characteristics according to the viewing angles. However, these modes still exhibit a deterioration in the luminance at the skewed angle. In particular, and as shown in FIGS. 10 and 11, the IPS mode uses a multi-domain to solve a color shift problem according to the viewing angles. The reference numerals 100 and 110 correspond to common electrodes, and the reference numerals 101 and 111 correspond to pixel electrodes in FIGS. 10 and 11. However, the multi-domain implemented in the IPS mode does not solve the problem of color shift in a black state. Rather, the IPS mode must use an expensive compensation film to solve this problem.

For example, FIG. 12 shows a contrast of the IPS mode free from the compensation film according to the viewing angles. As shown, the optical characteristics are deteriorated at the skewed angle compared with those in the front side.

In summary, the related art liquid crystal display device has the following problems. The TN, VA and IPS modes have a deteriorated contrast and luminance, and a color shift and/or gray inversion phenomenon at skewed angles. Further, it is difficult to commercialize the method of using a multi-domain because of the complex production and costs related to the multi-domain method.

SUMMARY OF THE INVENTION

Accordingly, one object of the present invention is to address the above-noted and other problems.

Another object of the present invention is to provide an LCD device using a multi-domain that is easy to produce and is less expensive.

To achieve these objects and other advantages and in accordance with the purpose of the invention, as embodied and broadly described herein, the present invention provides in one aspect a liquid crystal display (LCD) device including upper and lower substrates facing each other with a liquid crystal layer interposed therebetween, upper and lower polarization plates positioned on outer surfaces of the upper and lower substrates, respectively, and a beam steering film positioned on the upper polarization plate and including a plurality of curved-lenses formed on a surface of the beam steering film facing the upper polarization plate.

In another aspect, the present invention provides a liquid crystal display (LCD) device including upper and lower substrates facing each other with a liquid crystal layer interposed therebetween, upper and lower polarization plates positioned on outer surfaces of the upper and lower substrates, respectively, and a beam steering film positioned on the upper polarization plate and including a plurality of curved-lenses independently formed on a surface facing the upper polarization plate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
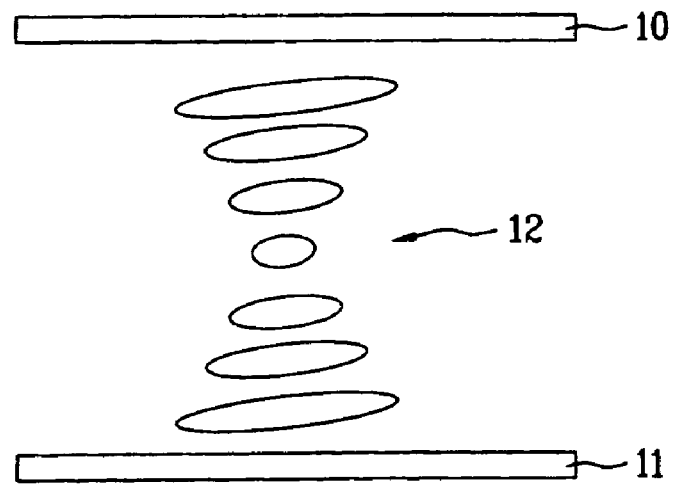
FIGS. 1A and 1B are overviews illustrating a concept of a related art TN mode LCD device.
Figure 1B:
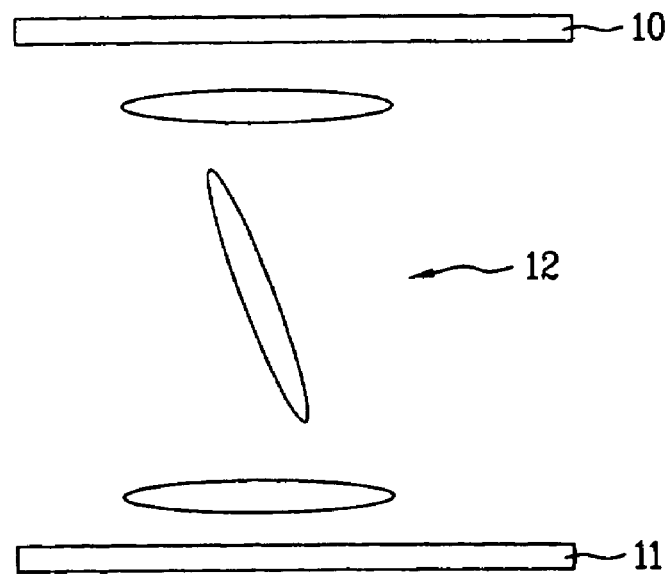
Figure 2:
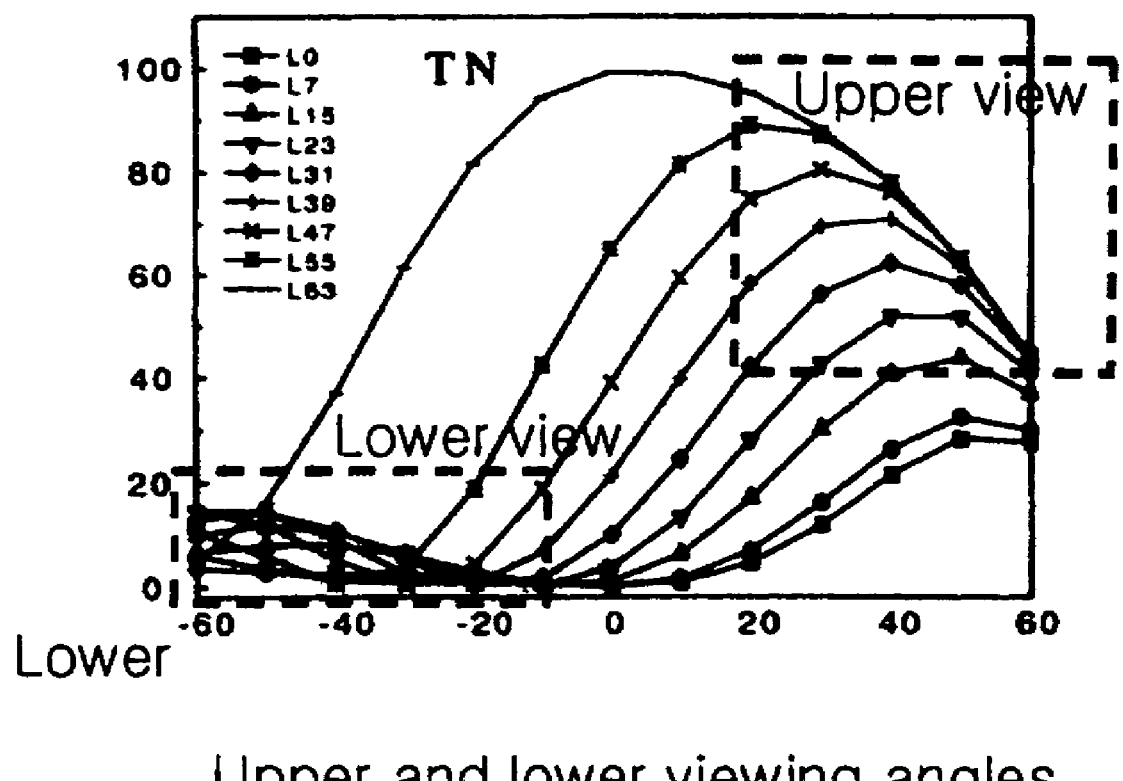
FIG. 2 is a graph illustrating a gray inversion phenomenon according to upper and lower viewing angles of the TN mode LCD device.
Figure 3A:
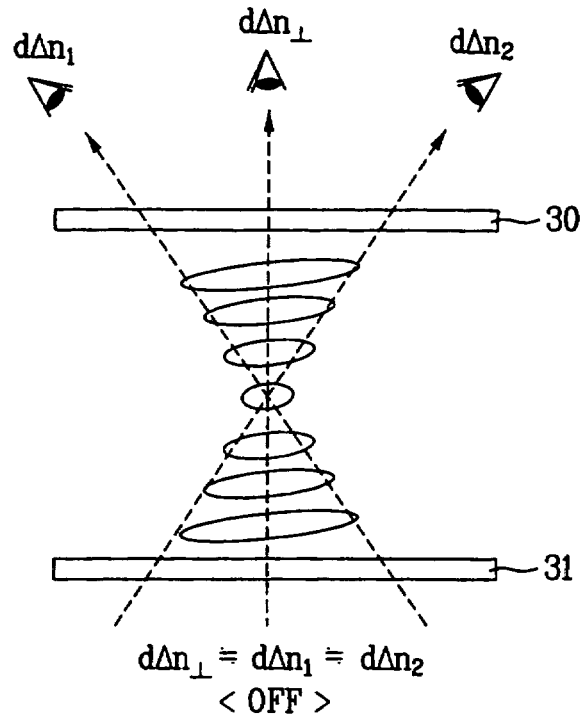
FIGS. 3A and 3B are overviews illustrating two upper and lower domains implemented in the TN mode LCD device.
Figure 3B:
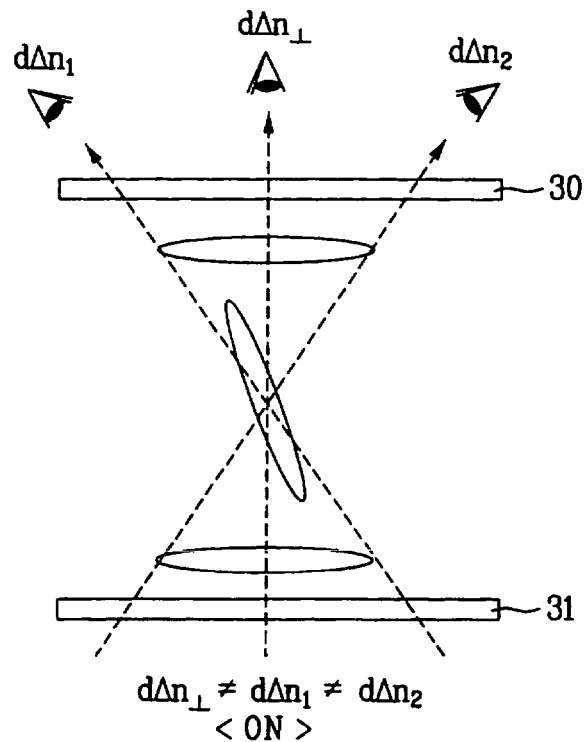
Figure 4:
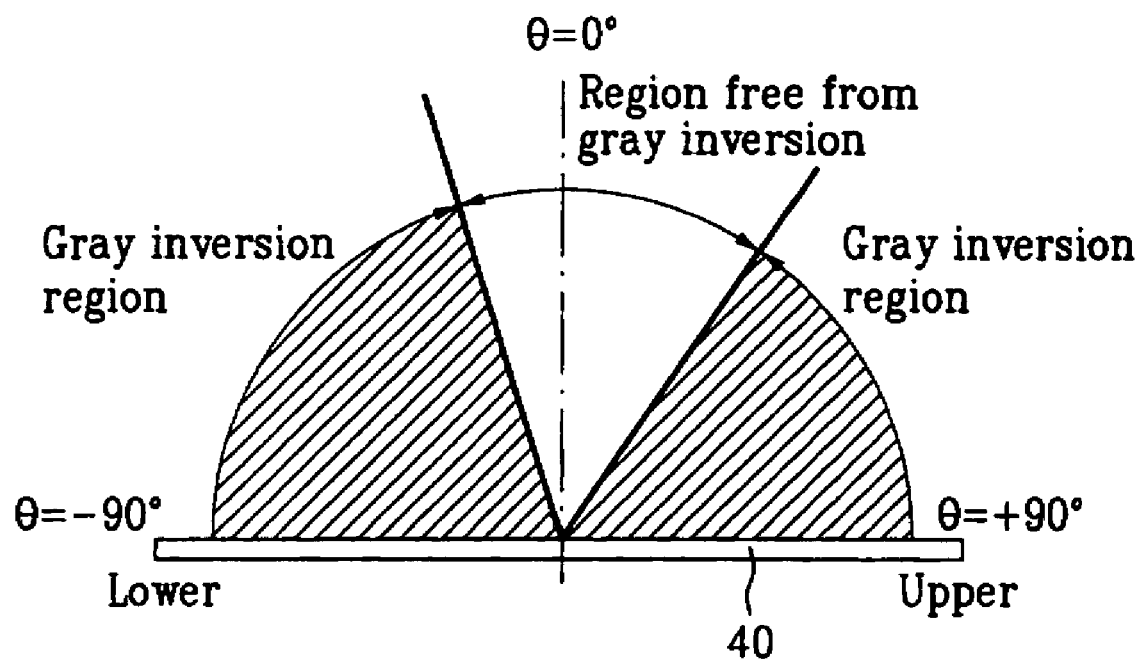
FIG. 4 is a overview illustrating an optical effect when implementing the two upper and lower domains.
Figure 5A:
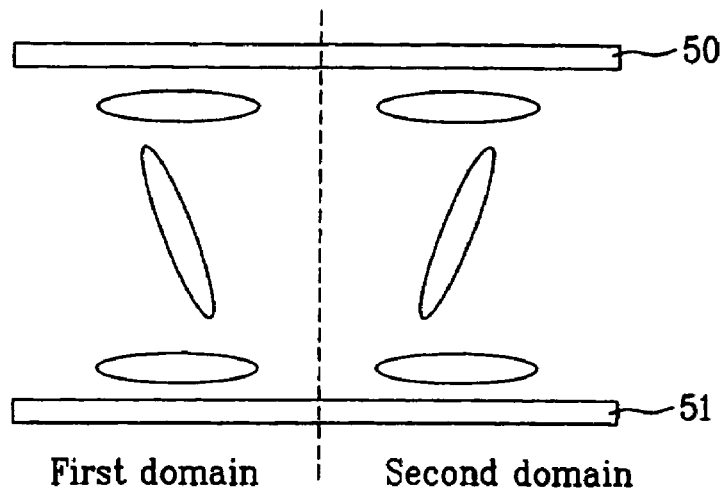
FIGS. 5A and 5B are overviews illustrating multiple domains used in the TN mode LCD device.
Figure 5B:
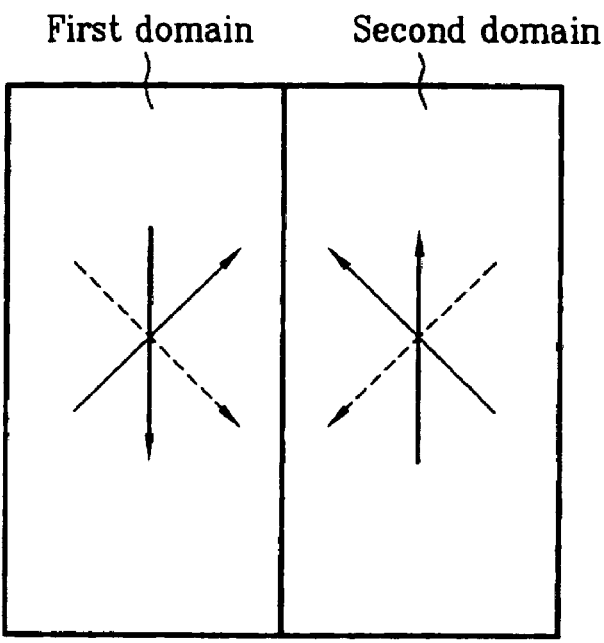
Figure 6:
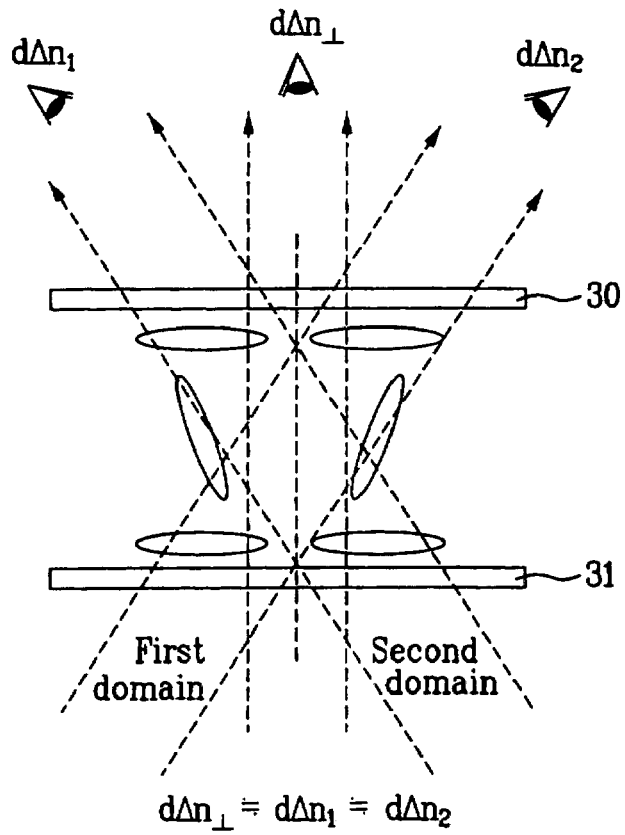
FIG. 6 is an overview illustrating a variation in refractivity according to upper and lower viewing angles in the TN mode LCD device.
Figure 7:
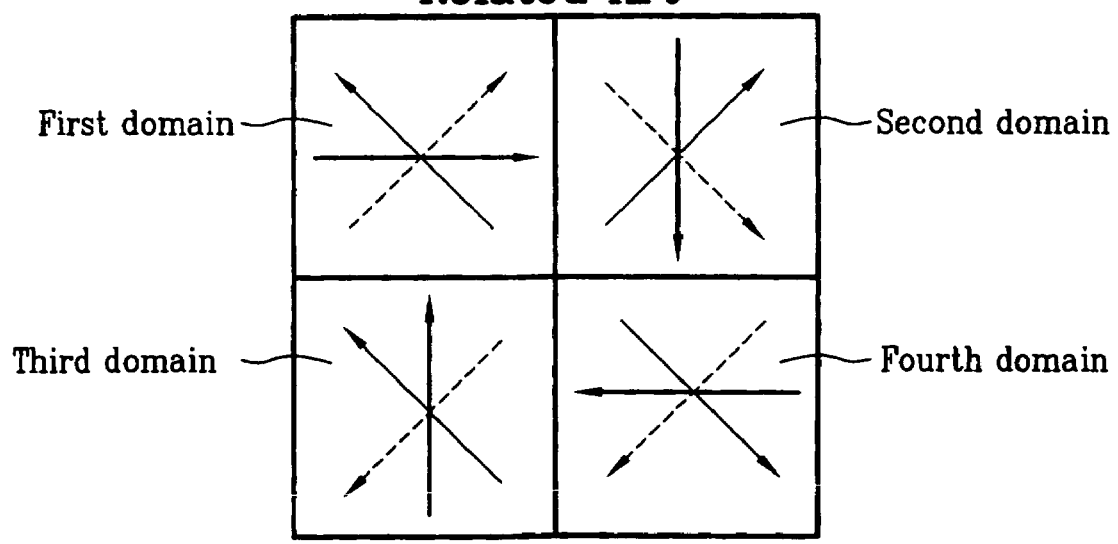
FIG. 7 is an overview illustrating regions where a gray inversion and color shift phenomenon occurs in the TN mode LCD device.
Figure 8:
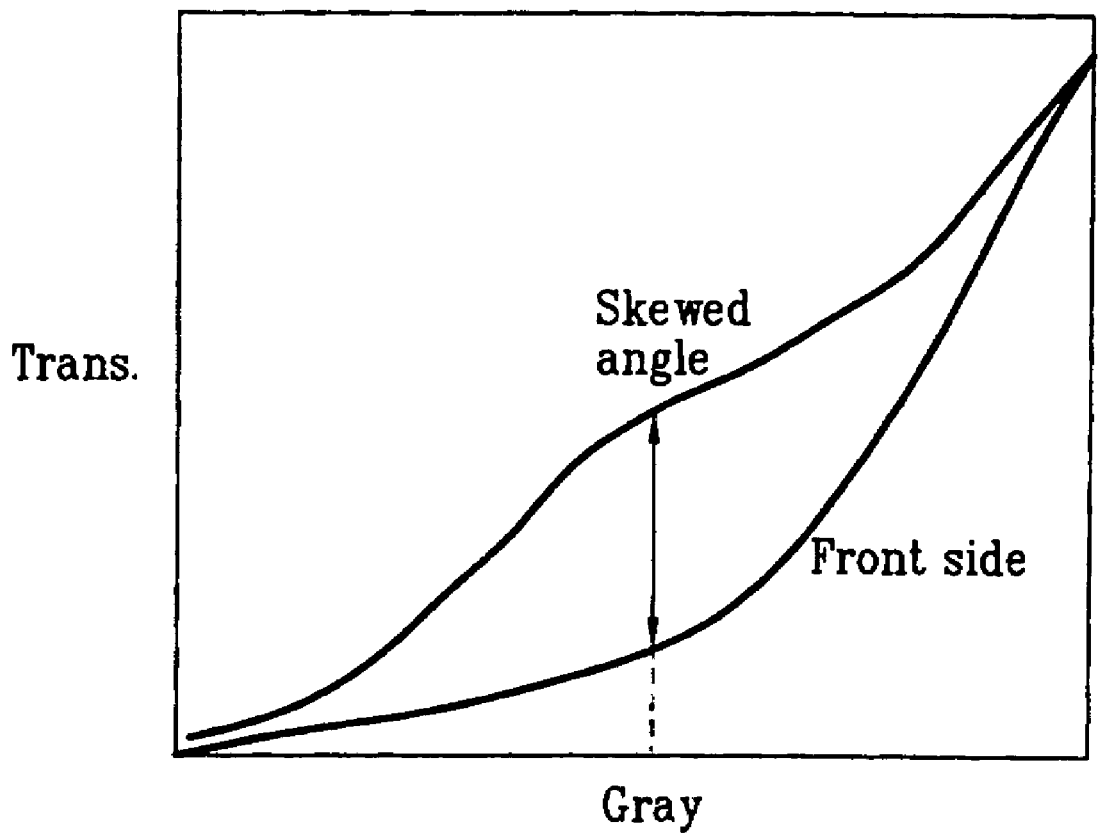
FIG. 8 is a graph illustrating gray characteristics according to viewing angles of a multi-domain VA mode LCD device.
Figure 9A:
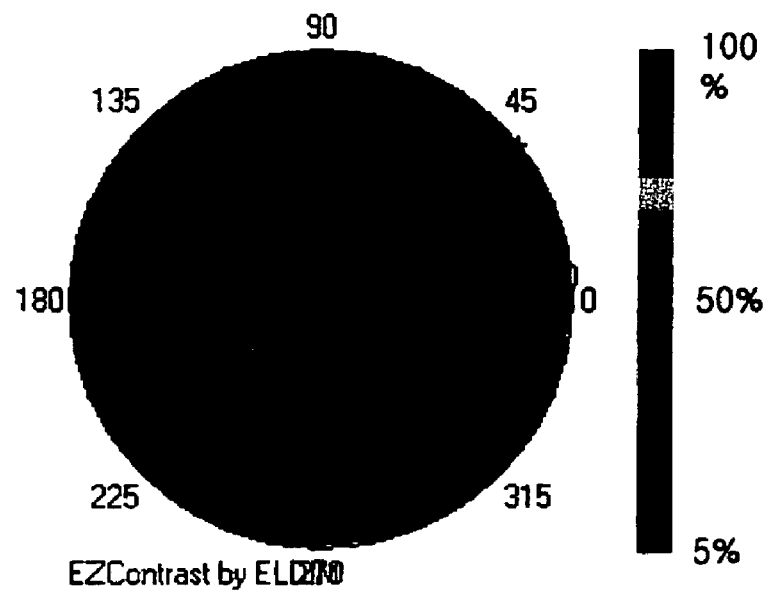
FIGS. 9A and 9B are pictures illustrating a luminance and contrast according to the viewing angles of the multi-domain VA mode LCD device.
Figure 9B:
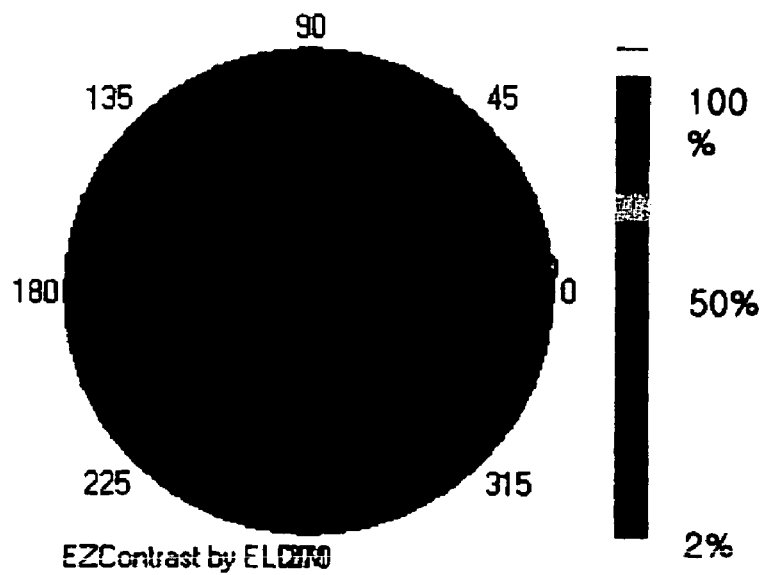
Figure 10:
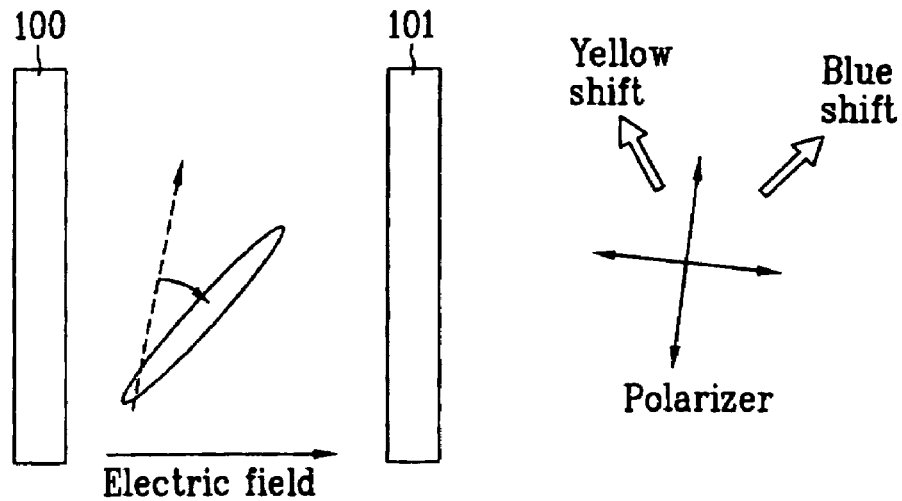
FIG. 10 is a conceptual view illustrating a color shift phenomenon according to directions of viewing angles in an IPS mode.
Figure 11:
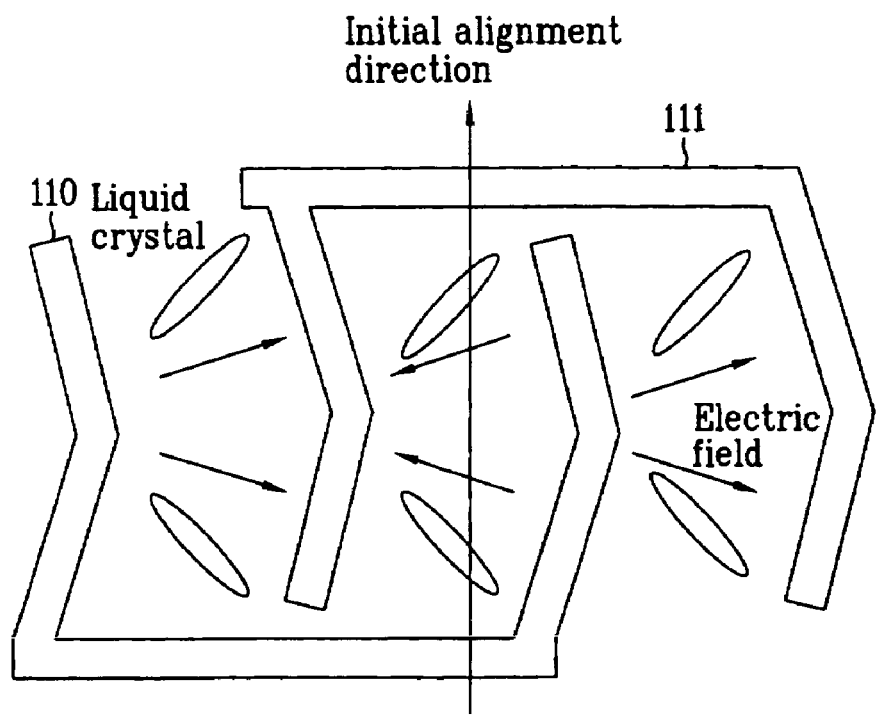
FIG. 11 is an overview illustrating a two-domain IPS mode LCD.
Figure 12:
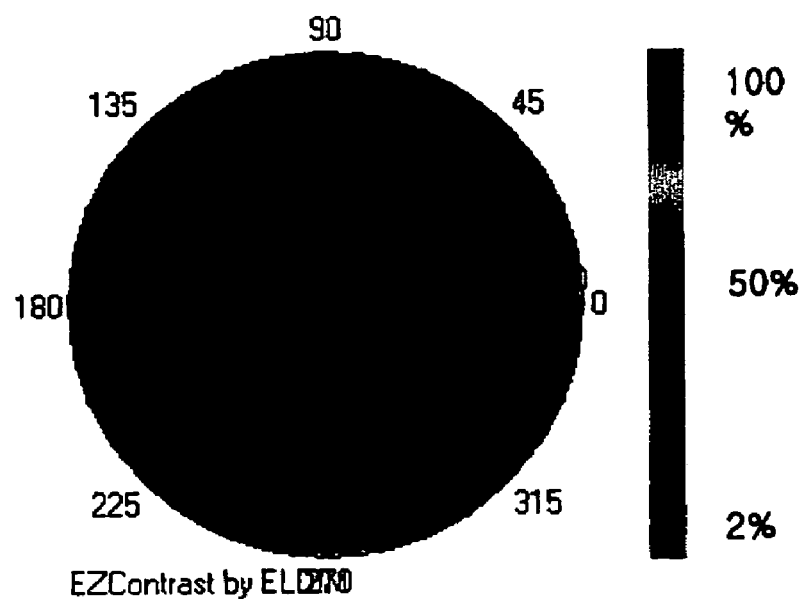
FIG. 12 is a picture illustrating a contrast according to viewing angles of the IPS mode LCD.
Figure 13:
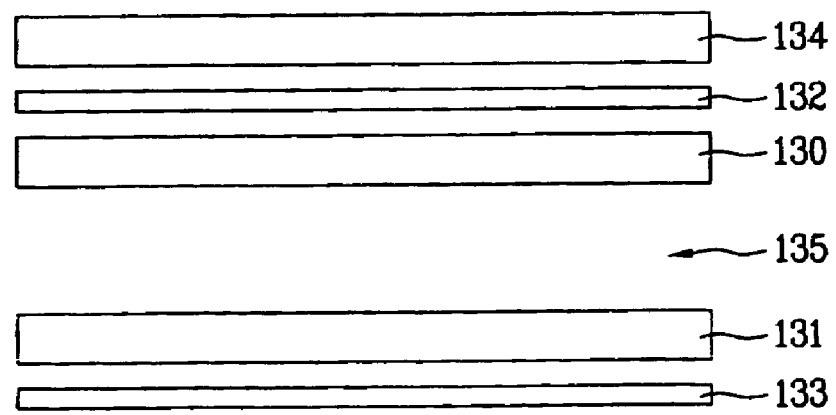
FIG. 13 is an overview illustrating a liquid crystal display device including a beam steering film according to one embodiment of the present invention.

Turning first to FIG. 13, which is an overview illustrating an LCD device including a beam steering film according to one embodiment of the present invention. As shown, the LCD device includes upper and lower substrates 130 and 131, a liquid crystal layer 135 filled with liquid crystals between the upper and lower substrates 130 and 131, upper and lower polarization plates 132 and 133 positioned on outer surfaces of the upper and lower substrates 130 and 131, respectively, and a beam steering film 134 positioned on the upper polarization plate 132 to permit implementation of a multi-domain by controlling light.

In more detail, the beam steering film 134 is provided to accomplish a cross-compensation effect in the multi-domain while maintaining a single direction of primary viewing angles of liquid crystals within a liquid crystal cell so as not to have two or more directions of the primary viewing angles.

Figure 14:
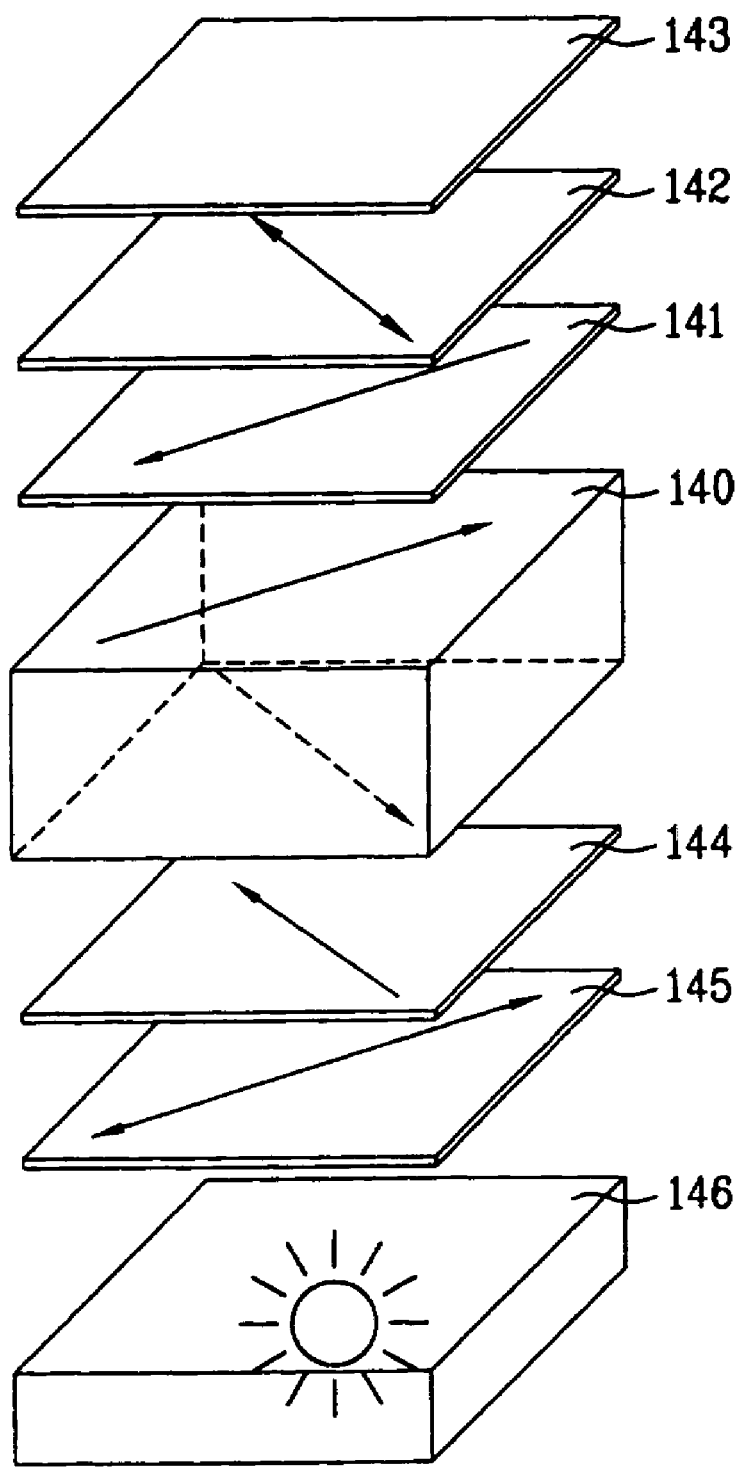
FIG. 14 is an overview illustrating a TN mode LCD device according to an embodiment of the present invention.

Next, FIG. 14 is an overview schematically showing a TN mode LCD device having the beam steering film 134 according to an embodiment of the present invention. As shown, the TN mode LCD device includes a liquid crystal cell 140 having upper and lower substrates with liquid crystals filled therebetween, first and second wide view films 141 and 144 respectively positioned on upper and lower surfaces of the liquid crystal cell 140, upper and lower polarization plates 142 and 145 respectively positioned on upper and lower surfaces of the first and second wide view films 141 and 144, a backlight unit 146 positioned below the lower polarization plate 145 to act as a light source, and a beam steering film 143 positioned on the upper polarization plate 142 to permit implementation of a multi-domain by controlling light.

Here, the directional arrows shown on the upper and lower surfaces of the liquid crystal cell 140 in FIG. 14 indicate a rubbing direction. In addition, the beam steering film is positioned on the uppermost surface of an LCD panel to achieve a cross-compensation effect as in the multi-domain while maintaining a single direction of primary viewing angles of liquid crystals within a liquid crystal cell so as not to have two or more directions of the primary viewing angle.

Figure 15:
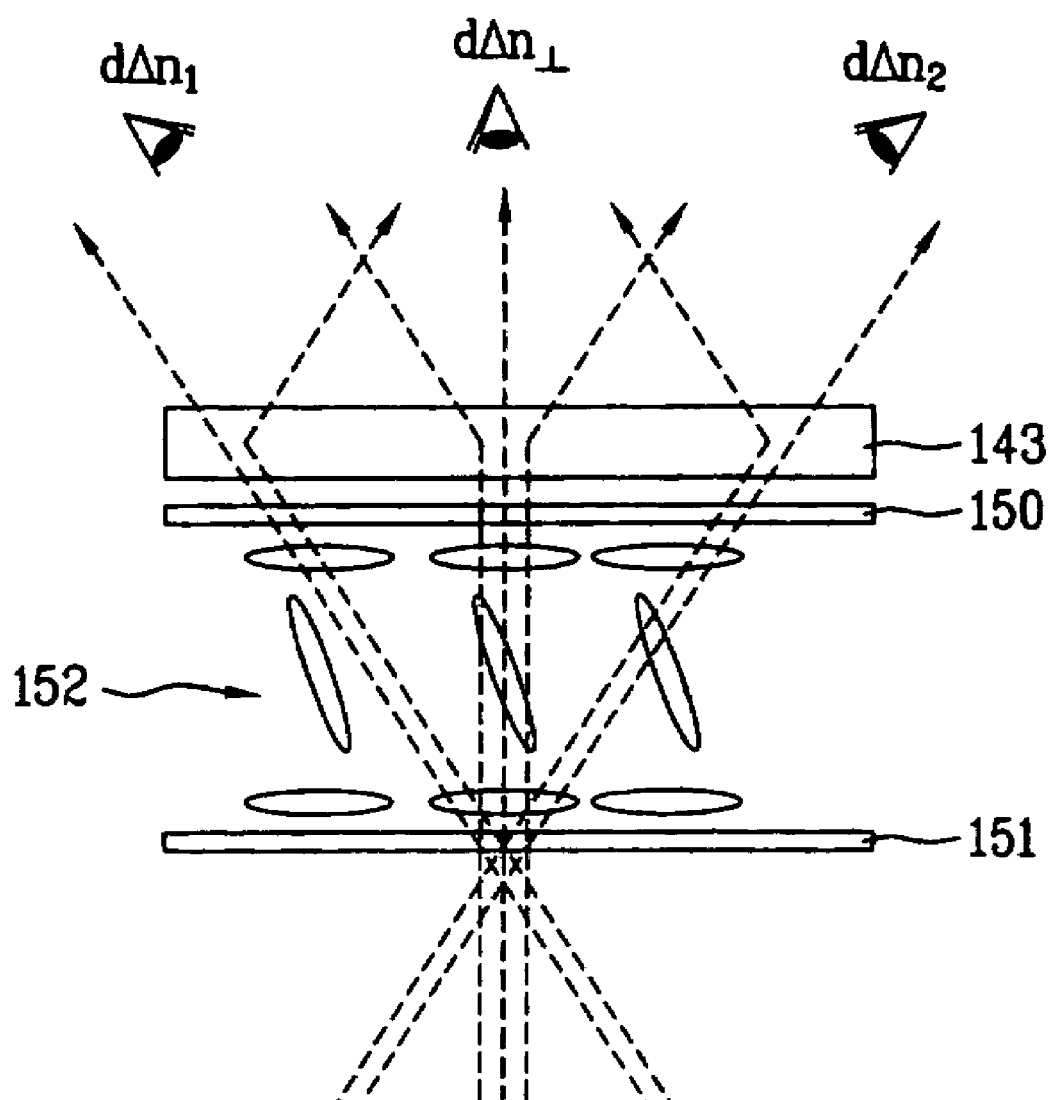
FIG. 15 is an overview illustrating the TN mode LCD device according to an embodiment of the present invention in which a multi-domain is implemented.

As shown in FIG. 15, the beam steering film serves to mix light after forcibly changing paths of the light propagating through the liquid crystal cell. Thus, according to an embodiment of the present invention, the LCD device accomplishes the multi-domain effect using the beam steering film 143. That is, the beam steering film is effective in mixing light propagating in the upper and lower directions in the TN mode LCD device. Further, the reference numerals 150, 151 and 152 in FIG. 15 correspond to upper and lower substrates, and a liquid crystal layer, respectively.

Embodiments of a beam steering film of the present invention positioned the uppermost surface of the LCD device will now be described.

Embodiment 1

Figure 16:
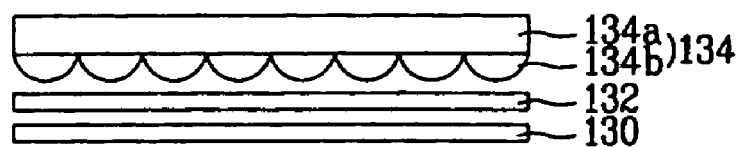
FIG. 16 is a cross-sectional view illustrating an LCD device including a beam steering film according to a first embodiment of the present invention.
Figure 16:
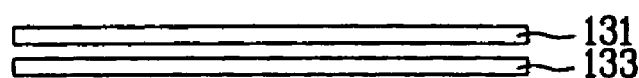
Figure 17:
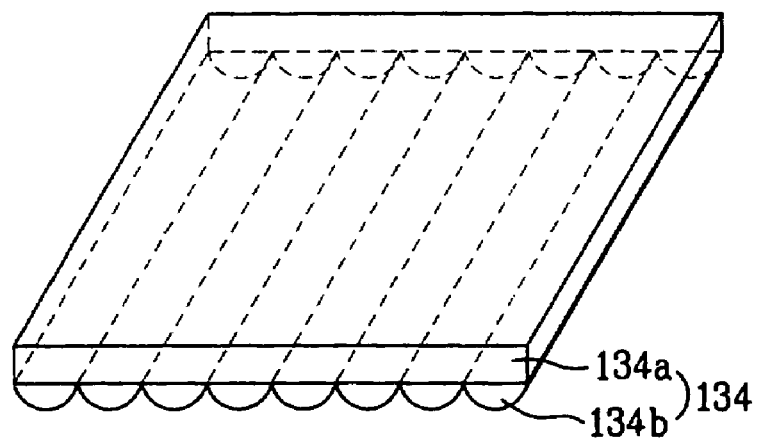
FIG. 17 is a perspective view illustrating the LCD device including the beam steering film according to the first embodiment of the present invention.

First, FIGS. 16 and 17 is are overviews illustrating an LCD device including a beam steering film according to the first embodiment. Referring to FIGS. 16 and 17, the LCD device includes the upper and lower substrates 130 and 131 facing each other with the liquid crystal layer 135 interposed therebetween, the upper and lower polarization plates 132 and 133 positioned on the outer surfaces of the upper and lower substrates 130 and 131, respectively, and the beam steering film 134 positioned on the upper polarization plate 132. As shown, the beam steering film 134 includes a plurality of curved-lenses formed on a surface facing the upper polarization plate.

In addition, as shown in FIGS. 16 and 17, the beam steering film 134 includes a planar supporting part 134*a* and a ridged part 134*b* having a plurality of curved-lenses. Further, the supporting part 134*a* may be integrally formed with the ridged part 134*b*. As shown, each of the curved-lens of the ridged part 134*b* has a convex shape, an equal width and is arranged in one direction.

Further, the supporting part 134*a* and the ridged part 134*b* include at least one of polymethylmethacrylate (PMMA), vinyl chloride, acrylic resins, polycarbonate (PC), polyethylene therephtalate (PET), polyethylene (PE), polystyrene (PS), polypropylene (PP), polyimide (PI) resins, glass and silica, or combination thereof. In addition, when the supporting part 134*a* and the ridged part 134*b* are formed as an integral component, the integral component may formed of the at least one or combination of the materials described above. In addition, these materials for the beam steering film 134 can also be applied to the second to sixth embodiments of the present invention.

Further, the ridged part 134*b* is spaced a predetermined distance from the upper polarization plate 132. Although not shown in the drawings, both sides of the beam steering film 134 are fixed by a fixing frame or other fixing mechanism to prevent the beam steering film 134 from contacting the upper polarization film 132. Further, each of the curved-lenses preferably has a width of about 300 μm or less for 100 ppi. In addition, as the width of each unit curved-lenses is decreased, it is more effective. Also, each curved-lens has a width not more than a length of a major axis of the LCD device.

Figure 18A:
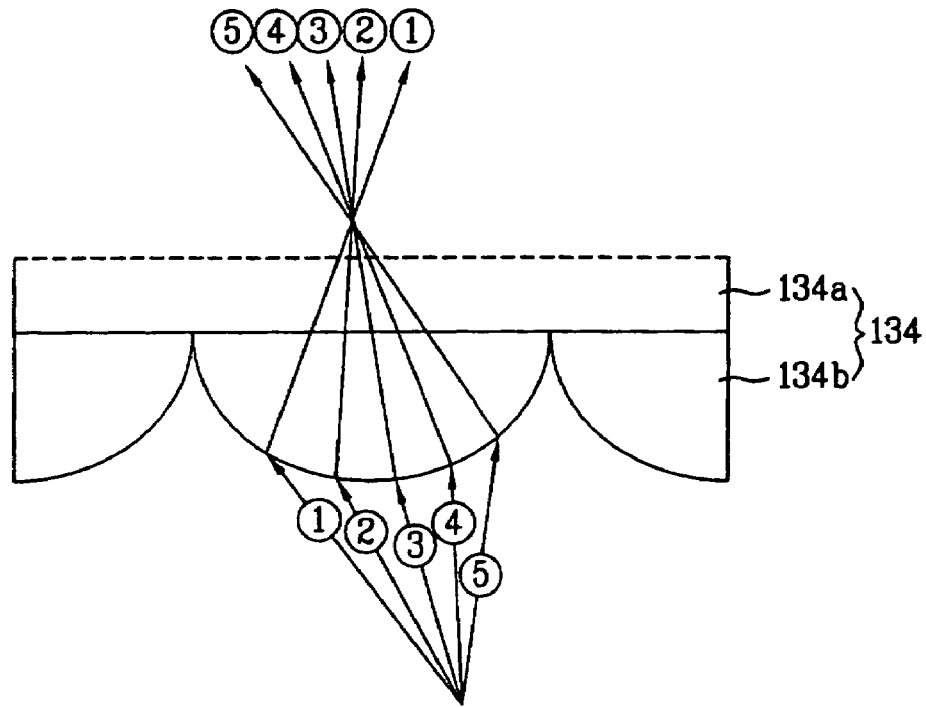
FIG. 18A is an overview illustrating an optical path conversion effect of the beam steering film according to an embodiment of the present invention.
Figure 18B:
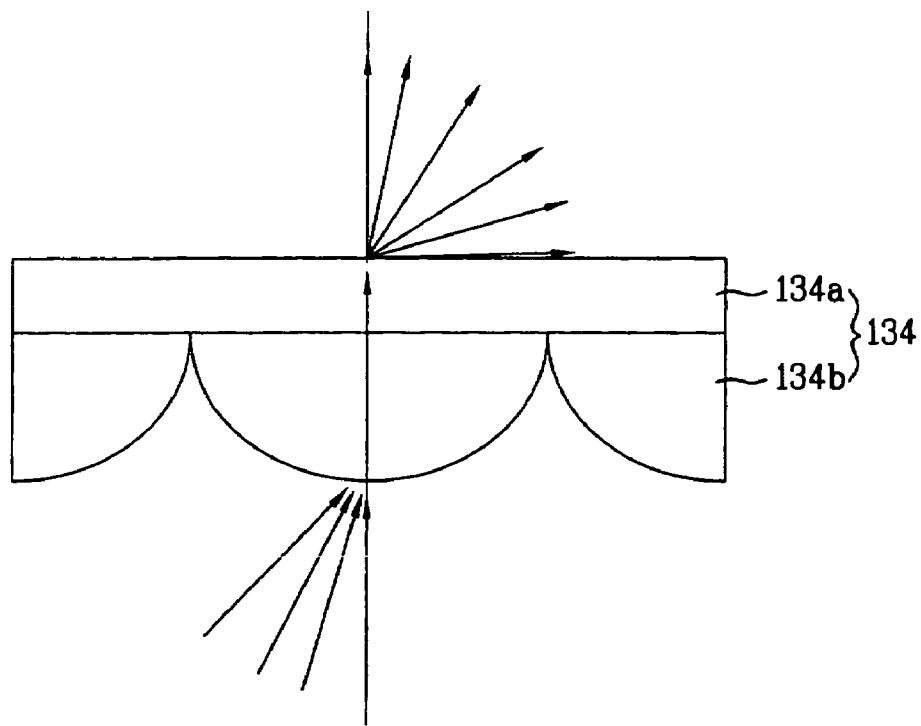
FIG. 18B is an overview illustrating a scattering effect of the beam steering film according to an embodiment of the present invention.

Turning next to FIGS. 18A and 18B, which illustrate an optical path conversion effect resulting from the refraction of the convex lenses, and a pseudo-multi domain effect resulting from a scattering thereof, respectively. Thus, using the beam steering film 134 in the LCD device according to the first embodiment, a user can view an image with a uniform luminance in all directions.

Figure 18C:
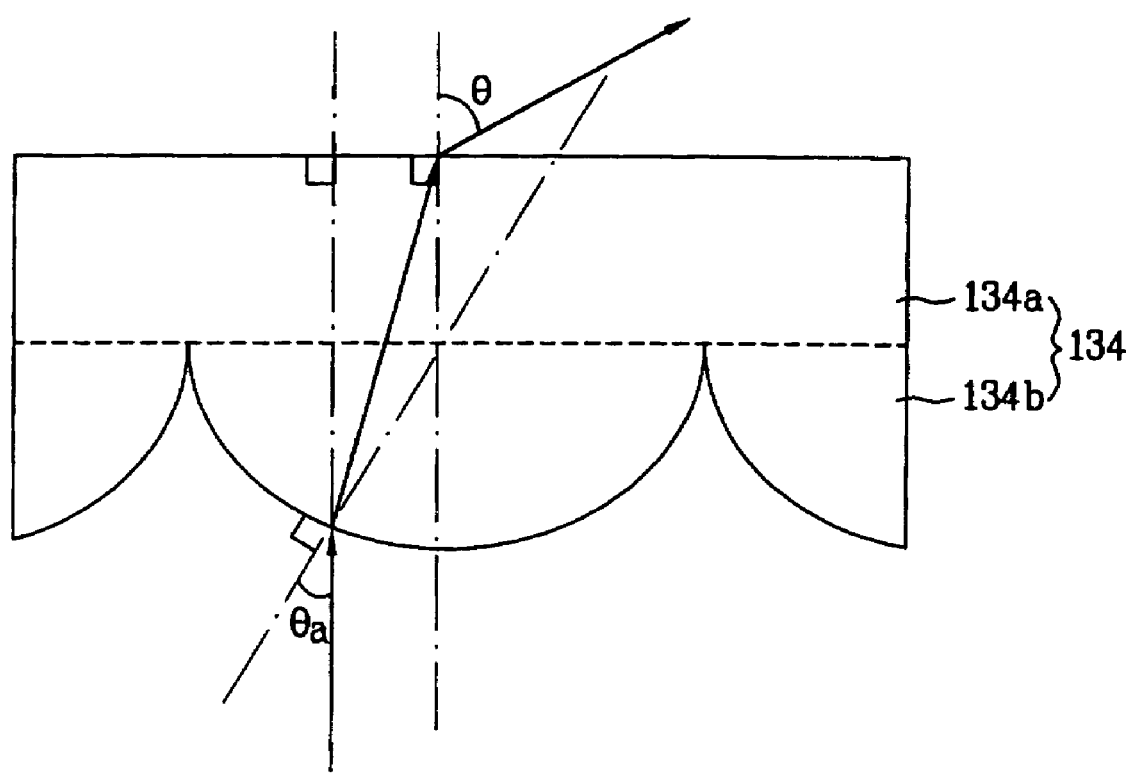
FIG. 18C is an overview illustrating an optical path control angle of the beam steering film according to an embodiment of the present invention.

Further, FIG. 18C illustrates how an angle by which light passes through the beam steering film 134 is bent according to Snell's law. Specifically, the angle is determined by an incident angle Θa of light incident on the film 134, a refractive index n of the film 134, and a refractive index n' of an incident layer contacting the ridged part of the film 134. The incident angle Θa of light is defined as an angle of incident light with respect to a tangential plane of an incident surface. The angle by which the light passes through the beam steering film 134 is bent is expressed by Equation 1:

$$\sin = \frac{n}{n'}\sin\left(\theta a - \sin^{-1}\left(\frac{n}{n'}\sin\theta a\right)\right)$$

where the incident layer is air.

Next, with reference to FIGS. 19A to 33, the LCD device of the present invention including the beam steering film according to the first embodiment will be compared with a related art TN mode LCD device in terms of the viewing angle, the contrast ratio and a visual sensation in white and black states.

Figure 19A:
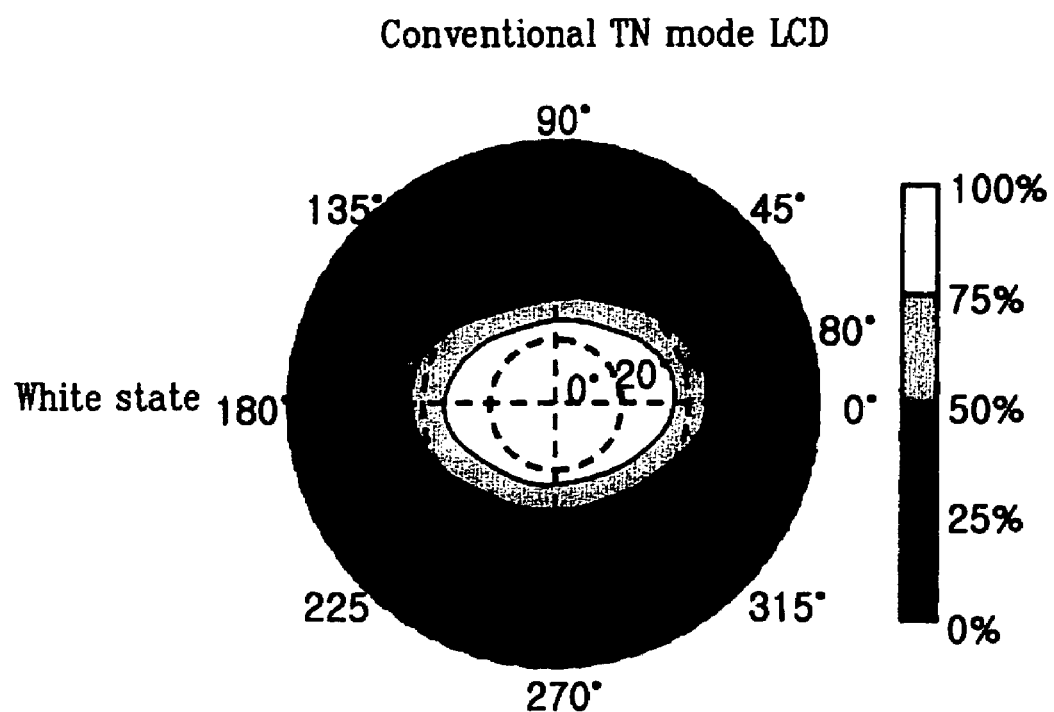
FIGS. 19A to 21B are graphs comparing viewing angle contours and contrast ratios in a white state and in a black state of an LCD device including the beam steering film according to an embodiment of the present invention and of a related art LCD device.
Figure 19B:
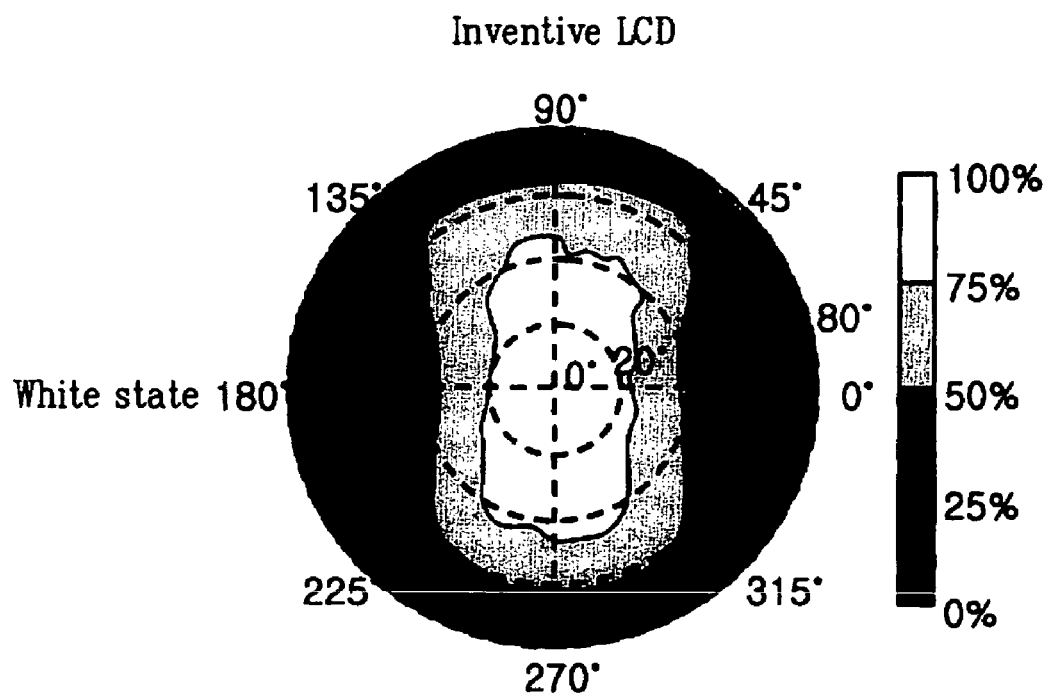
Figure 20A:
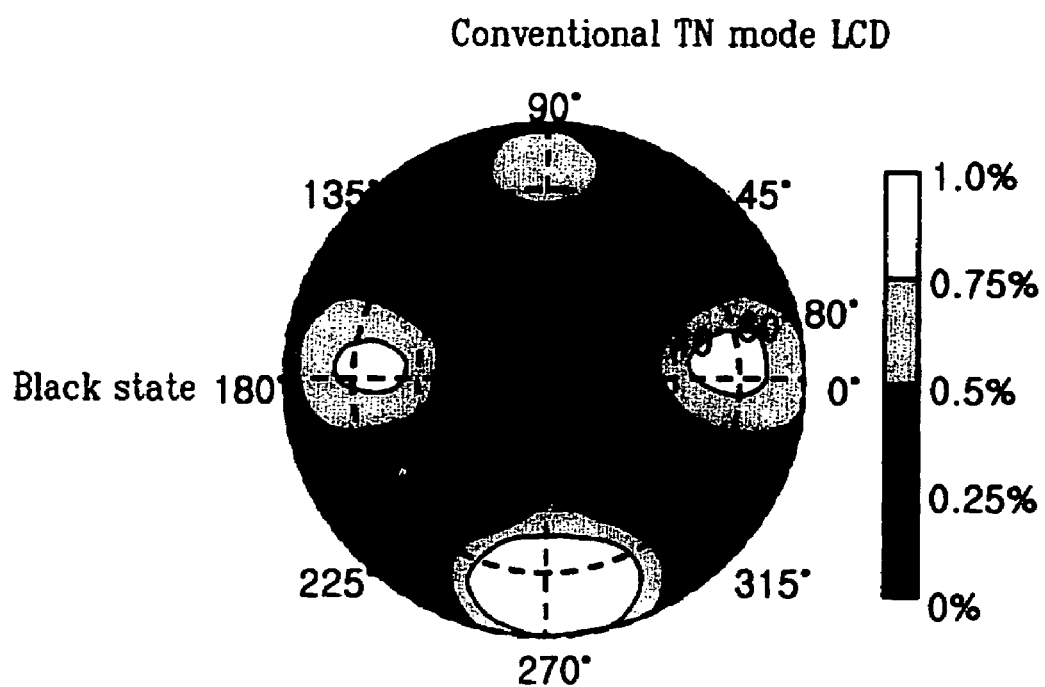
Figure 20B:
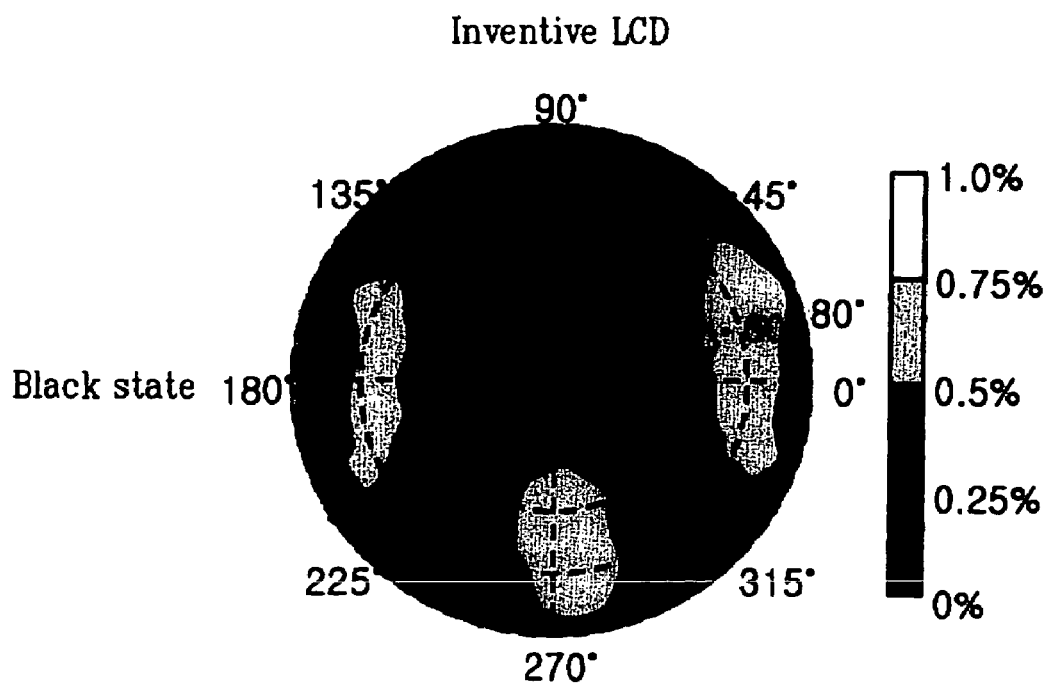

First, as shown in FIGS. 19A and 19B, the LCD device including the beam steering film of the present invention exhibits improved characteristics in terms of upper and lower viewing angles compared with those of the related art TN mode LCD device in the white state. In addition, as shown in FIGS. 20A and 20B, the LCD device including the beam steering film of the present invention exhibits a wide distribution of black compared with that of the related art TN mode LCD device in the black state.

Figure 21A:
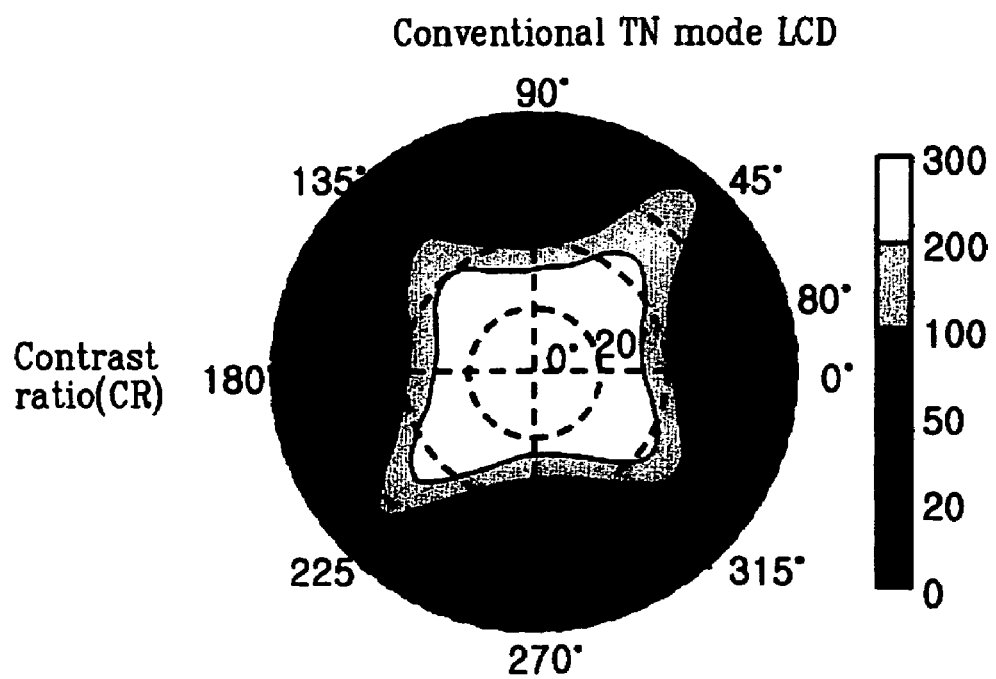
Figure 21B:
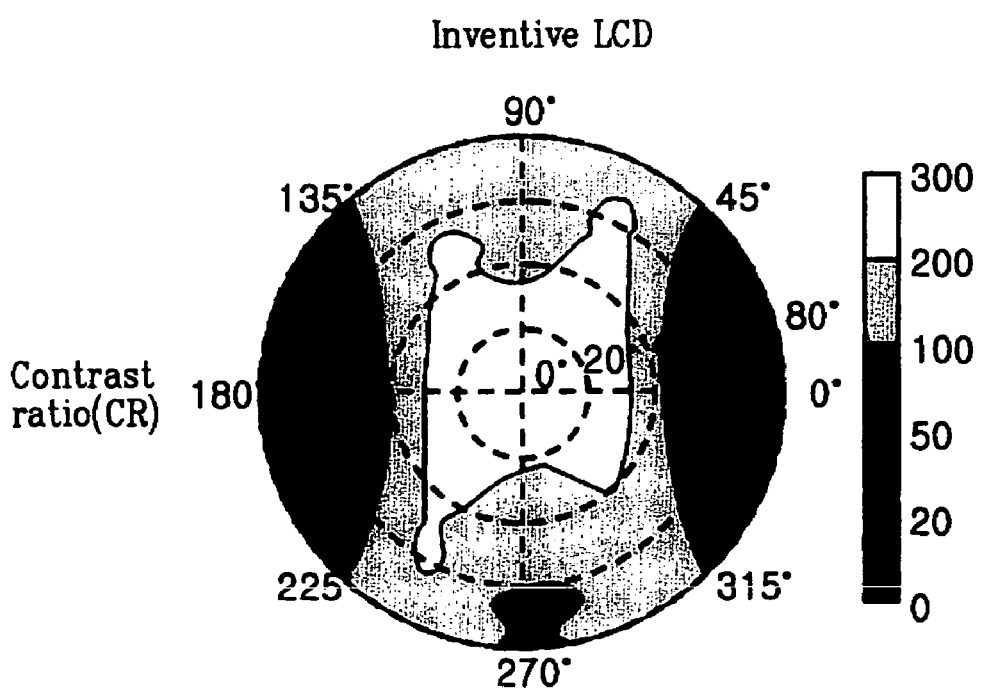
Figure 22:
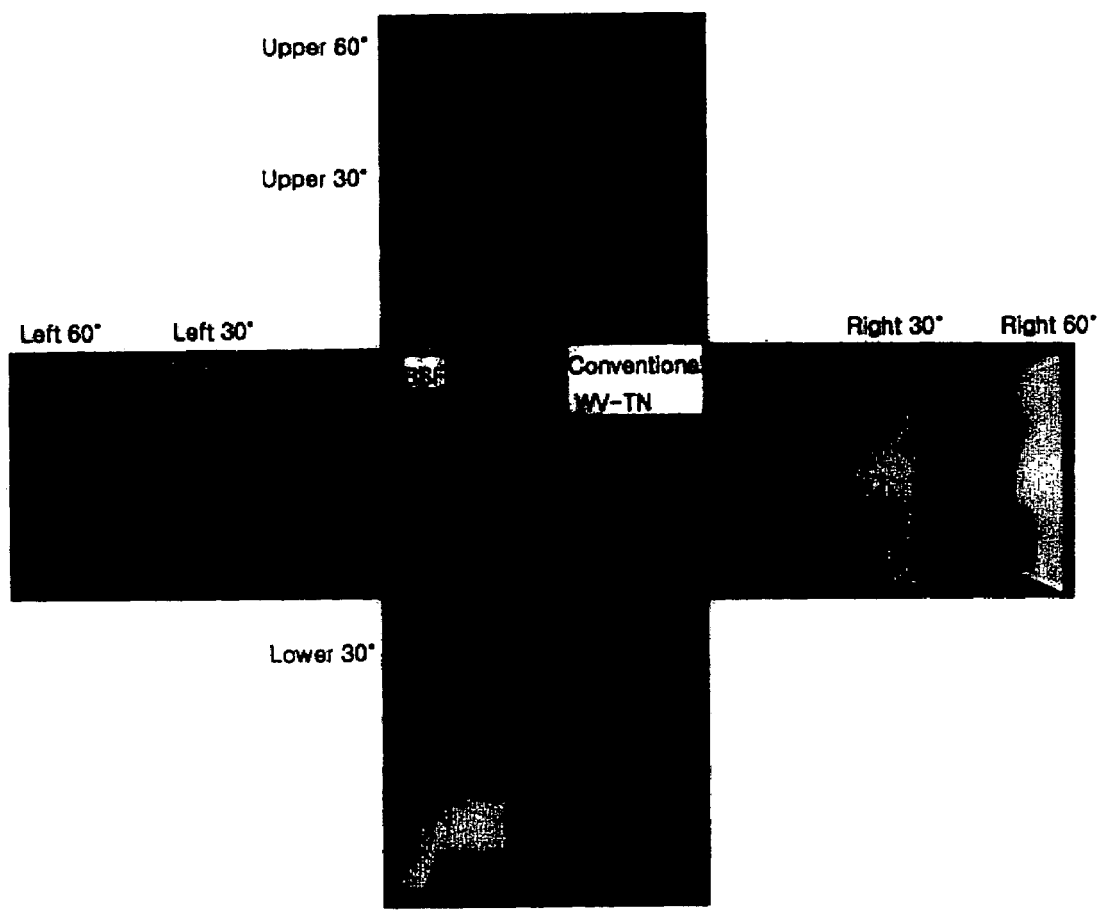
FIG. 22 is an overview comparing a visual sensation of the LCD device including the beam steering film of an embodiment of the present invention with that of the related art LCD device.

Furthermore, as shown FIGS. 21A and 21B, the LCD device including the beam steering film of the present invention exhibits improved characteristics in terms of the contrast ratio at upper and lower portions thereof compared with those of the related art TN mode LCD device. In addition, as shown in FIG. 22, the related art TN mode LCD device exhibits a negative visual sensation at upper, lower, right and left portions thereof due to the occurrence of the gray inversion, whereas the LCD device including the beam steering film of the present invention is free from the gray inversion at the upper, lower, right and left portions thereof. Thus, the LCD device including the beam steering film of the present invention exhibits an improved visual sensation compared to the related art TN mode LCD device.

Figure 23A:
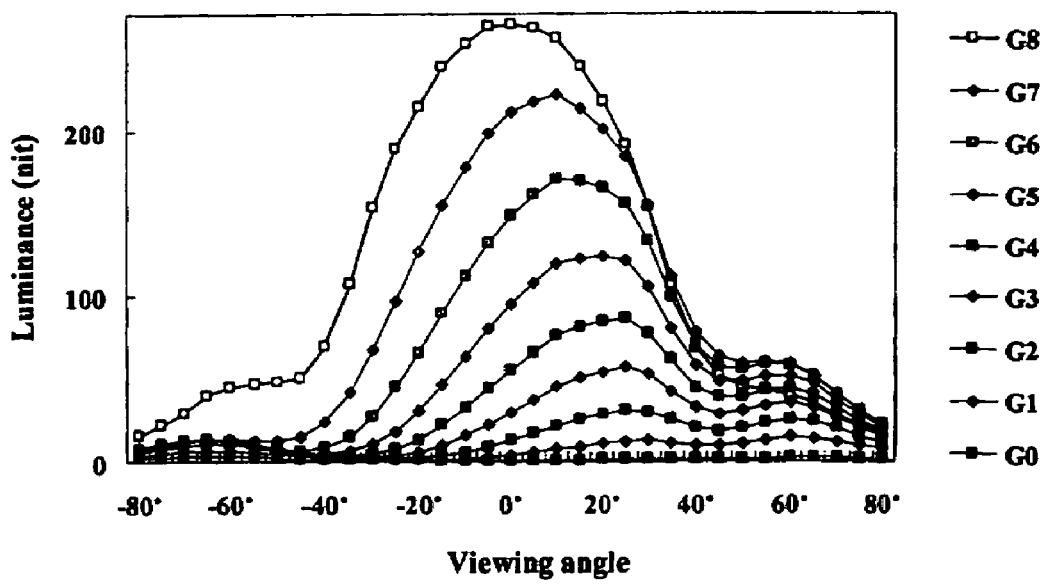
FIGS. 23A and 23B are graphs comparing upper and lower gray scales of the LCD device including the beam steering film of an embodiment of the present invention and those of the related art LCD device, respectively.
Figure 23B:
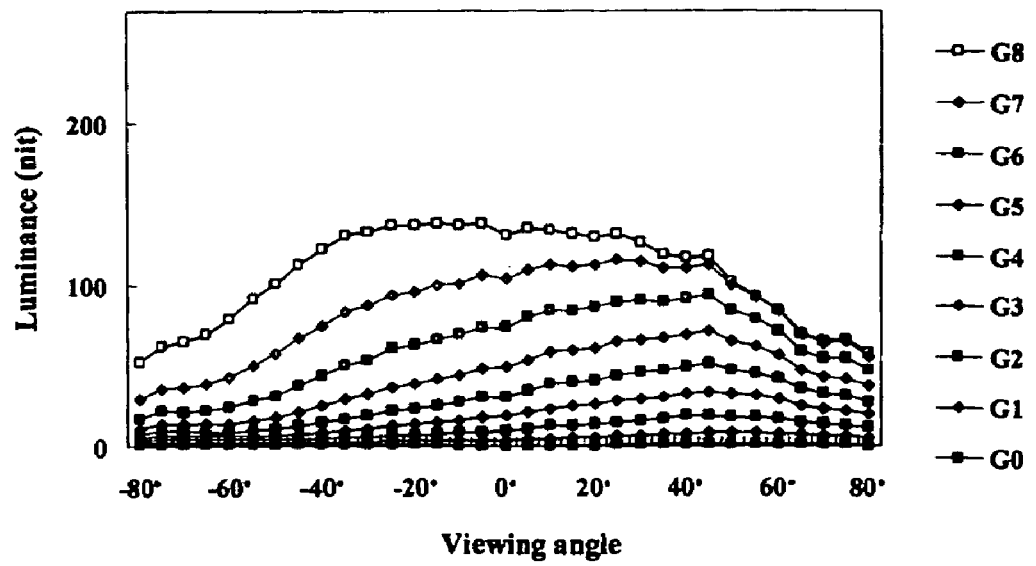

In addition, FIGS. 23A and 23B illustrate a comparison between the LCD device including the beam steering film and the related art TN mode LCD regarding upper and lower gray-scales. First, as shown in FIG. 23A, when showing gray scales of 9 stages from black to white for the related art TN mode LCD device for the upper and lower viewing angles, the gray inversion and gray conglomeration begin to occur at about 15 degrees of the lower viewing angle, and the gray inversion of the brightest gray scale begins to occur at about 20 degrees of the upper viewing angle. Here, "G0" indicates black, and "G8" indicates white.

As described above, a color conglomeration phenomenon at the upper and lower viewing angles occurs. In particular, a more severe color conglomeration phenomenon occurring at the lower viewing angle than at the upper viewing angle causes the gray inversion phenomenon, thereby providing a negative gray characteristic to the related art TN mode LCD device. In addition, the related art TN mode LCD device exhibits an negative uniformity in an overall luminance due to a significant difference in the luminance between a viewing angle at a central region thereof and an upper or lower viewing angle.

In contrast, and as shown in FIG. 23B, the LCD including the beam steering film of the present invention is free from the gray inversion phenomenon at the upper and lower viewing angles, and exhibits positive uniformity in overall luminance due to a negligible difference in the luminance between a viewing angle at a central region thereof and an upper or lower viewing angle.

Embodiments 2 to 14

Next, the LCD device including the beam steering film according to the second to fourteenth embodiments of the present invention will be described. Further, the LCD device according to the second to fourteenth embodiments have the same construction as the LCD device shown in FIG. 16 excluding the beam steering film. Hence, a redundant description will be omitted, and the same components will be denoted by the same reference numerals.

Embodiment 2

Figure 24:
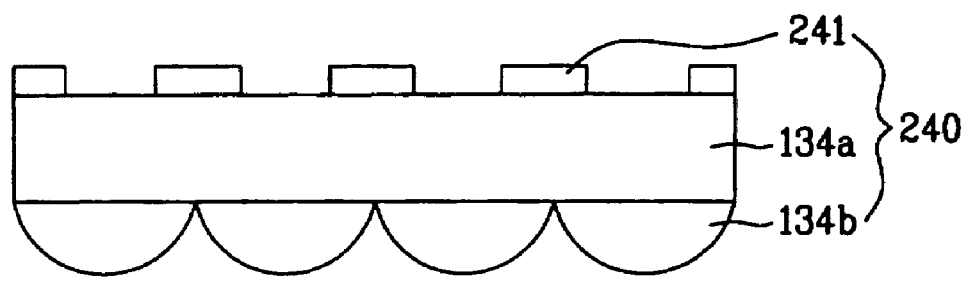
FIG. 24 is a cross-sectional view illustrating an LCD device including a beam steering film according to a second embodiment of the present invention.

First, referring to FIG. 24, a beam steering film 240 according to the second embodiment is positioned on the upper polarization plate 132 (see FIG. 16). The beam steering film 240 includes a plurality of curved-lenses formed on one surface facing the upper polarization plate 132, and a plurality of slits 241 formed on the other surface and corresponding to borders between the curved-lenses to shield or reflect light.

Specifically, the beam steering film 240 includes the planar supporting part 134a and the ridged part 134b having the plurality of curved-lenses. The film 240 also includes the plurality of slits 241 arranged in one direction on an upper surface of the supporting part 134a and corresponding to the borders between the curved-lens shapes of the ridged part 134b. Further, the supporting part 134a may be integrally formed with the ridged part 134b.

In addition, each of the curved-lens of the ridged part 134b has a convex shape, an equal width and is arranged in one direction. Alternatively, the curved-lenses may have different widths. Further, the ridged part 134b is spaced a predetermined distance from the upper polarization plate 132. Although not shown in the drawings, both sides of the beam steering film 240 are fixed by a fixing frame or other fixing mechanisms to prevent the beam steering film 240 from contacting the upper polarization film 132.

Also, each of the curved-lenses preferably has a width of about 300 μm or less for 100 ppi. In addition, as the width of each of the unit curved-lenses is decreased, the lens is more effective. In addition, each curved-lens has a width of not more than a length of a major axis of the LCD device. Further, a width of the slit 241 is preferably less than 100% of a width of opening region of one pixel.

Figure 25:
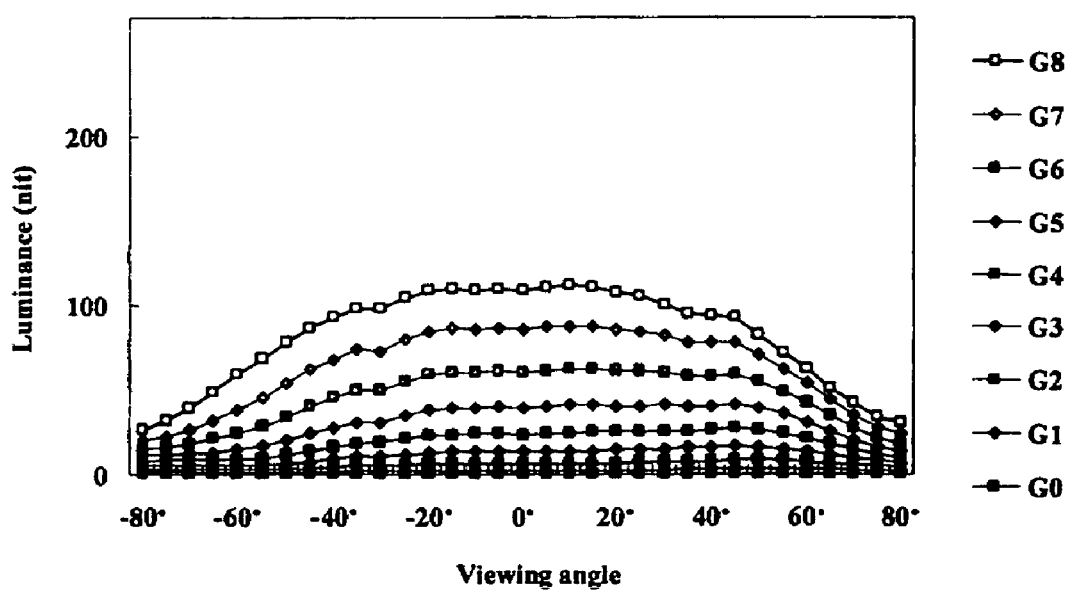
FIG. 25 is a graph illustrating upper and lower gray scales of the LCD device including the beam steering film according to an embodiment of the present invention.
Figure 26:
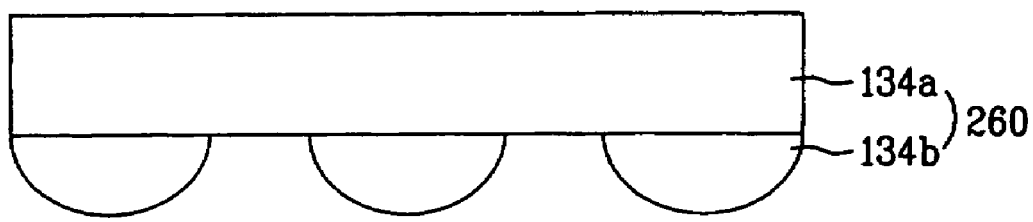
FIGS. 26 to 32 are cross-sectional views illustrating LCD devices including beam steering films according to third to ninth embodiments of the present invention, respectively.

Therefore, as shown in FIG. 25, when the beam steering film is provided with the slits 241 capable of shielding or reflecting light as described above, the LCD device is further improved in gray characteristics at the upper and lower viewing angles, and thus has a more uniform luminance.

Embodiments 3 to 5

The beam steering films according to the third to fifth embodiments of the present invention overcome a deterioration in luminance in the front side of a LCD device. First, referring to FIG. 26, a beam steering film 260 according to the third embodiment is positioned on the upper polarization plate 132 (see FIG. 16).

The beam steering film 260 includes a plurality of curved-lenses formed on one surface facing the upper polarization plate 132, and is planar between the curved-lenses. Specifically, the beam steering film 260 includes the supporting part 134a having a predetermined thickness, and the ridged part 134b having the plurality of curved-lenses spaced a predetermined distance from each other and being arranged in one direction on a lower surface of the supporting part 134a with a planar section formed between the curved-lenses.

The supporting part 134a may be integrally formed with the ridged part 134b. Further, the planar section between the curved-lenses of the ridged part 134b improves the luminance in the front side of the LCD device, because the light propagates straightly without being bent on this section.

Figure 27:
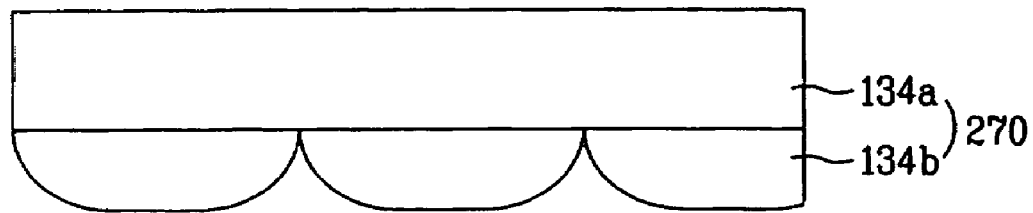

Next, referring to FIG. 27, a beam steering film 270 according to the fourth embodiment is positioned on the upper polarization plate 132 (see FIG. 16). The beam steering film 270 includes a plurality of curved-lenses formed on one surface of the beam steering film 270 facing the upper polarization plate 132, in which each curved-lens has a flat central region. Specifically, the beam steering film 270 includes the supporting part 134a having a predetermined thickness, and the ridged part 134b having the plurality of curved-lenses arranged in one direction on a lower surface of the supporting part 134a, where each curved-lens of the ridged part 134b has the flat central region.

In addition, each curved-lens of the ridged part 134b has a convex lens shape, and the supporting part 134a may be integrally formed with the ridged part 134b. The flat regions improve the luminance in the front side of the LCD device because the light propagates straightly without being bent on these regions.

Figure 28:
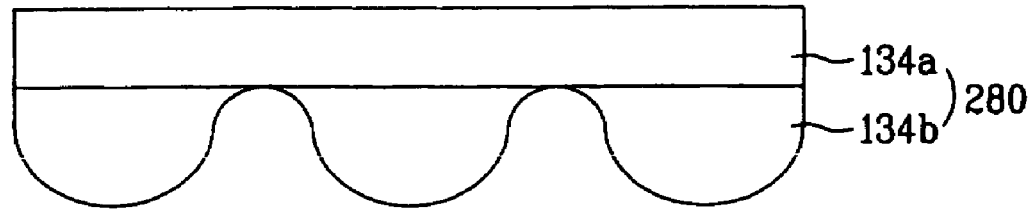

Next, referring to FIG. 28, a beam steering film 280 according to the fifth embodiment is positioned on the upper polarization plate 132 (see FIG. 16). The beam steering film 280 includes a plurality of curved-lenses formed on one surface of the beam steering film 280 facing the upper polarization plate 132, and a plurality of concave lenses 281, each of which is formed between the curved-lenses.

Specifically, the beam steering film 280 includes the supporting part 134a having a predetermined thickness, and the ridged part 134b having a plurality of curved-lenses arranged in one direction on a lower surface thereof. Further, the plurality of curved-lenses of the ridged part 134b include a plurality of convex lenses and plurality of concave lenses, each of which is formed between the convex lenses. Also, the supporting part 134a may be integrally formed with the ridged part 134b. Further, when a concave lens is formed in each space between the convex lenses of the ridged part 134b, the concave lenses improve the luminance in the front side of the LCD device.

Embodiments 6 to 9

Figure 29:
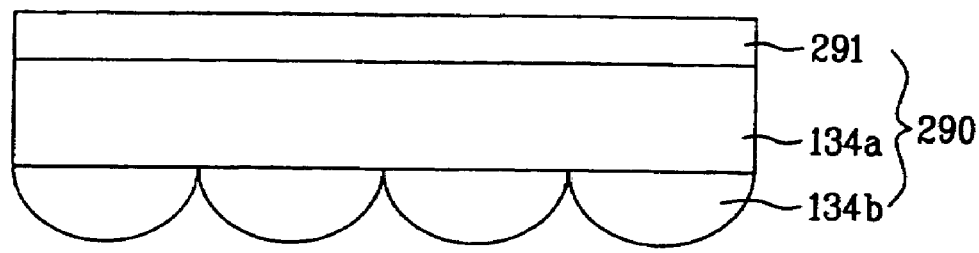

Next, the beam steering films according to the sixth to ninth embodiments of the present invention overcome the Moire phenomenon of light. Referring to FIG. 29, a beam steering film 290 according to the sixth embodiment is positioned on the upper polarization plate 132 (see FIG. 16). The beam steering film 290 includes the plurality of curved-lenses formed on one surface facing the upper polarization plate 132, and a scattering layer 291 formed on the other surface.

Specifically, the beam steering film 290 includes the planar supporting part 134a, the ridged part 134b having the plurality of curved-lenses, and the scattering layer 291 formed on an upper surface of the supporting part 134a to provide a Haze property. The supporting part 134a may be integrally formed with the ridged part 134b. In addition, each of the curved-lenses has a convex shape and is arranged in one direction. Thus, with the scattering layer 291 for the Haze property formed on the upper surface of the beam steering film 290 as described above, it is possible to overcome the Moire phenomenon of light.

Figure 30:
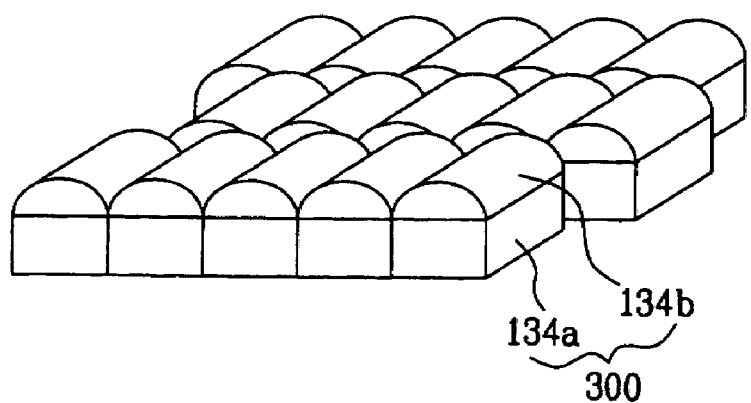

Next, referring to FIG. 30, a beam steering film 300 according to the seventh embodiment is positioned on the upper polarization plate 132 (see FIG. 16). The beam steering film 300 includes a plurality of curved-lenses randomly arranged on one surface facing the upper polarization plate 132. Specifically, the beam steering film 300 includes a plurality of randomly arranged supporting parts 134a, and a plurality of ridged parts 134b respectively formed on lower surfaces of the supporting parts 134a, where each of the ridged parts 134b has the plurality of curved-lens. The supporting part 134a may be separately or integrally formed with the ridged part 134b. In addition, each of the curved-lenses of the ridged part 134b has a convex shape.

Further, although the ridged part of the beam steering film 300 is shown facing upwardly in FIG. 30, the ridged part is configured to face the upper polarization plate (see FIG. 16). Thus, when the curved-lenses of the beam steering film 300 are randomly arranged instead of being arranged linearly, it is possible to overcome the Moire phenomenon of light.

Figure 31:
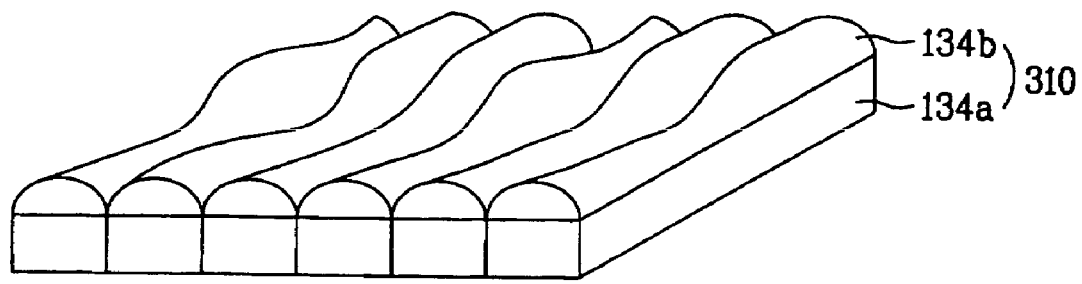

Next, referring to FIG. 31, a beam steering film 310 according to the eighth embodiment is positioned on the upper polarization plate 132 (see FIG. 16). The beam steering film 300 includes a plurality of wavy curved-lenses formed on one surface facing the upper polarization plate 132. Specifically, the beam steering film 310 includes the planar supporting part 134a, and the ridged part 134b having the plurality of wavy curved-lenses formed on a lower surface of the supporting part 134a, where each of the wavy curved-lens shapes of the ridged part 134b has a variable thickness.

Further, the supporting part 134a may be integrally formed with the ridged part 134b. In addition, the curved-lenses of the ridged part 134b have an equal width and are arranged in one direction. Also, each of the curved-lenses of the ridged part 134b has a convex shape.

Although the ridged part 134b of the beam steering film 310 is shown facing upwardly in FIG. 31, the ridged part is configured to face the upper polarization plate (see FIG. 16). In addition, when the ridged part 134b is formed in the wavy shape as described above, it is possible to overcome the Moire phenomenon of light.

Figure 32:
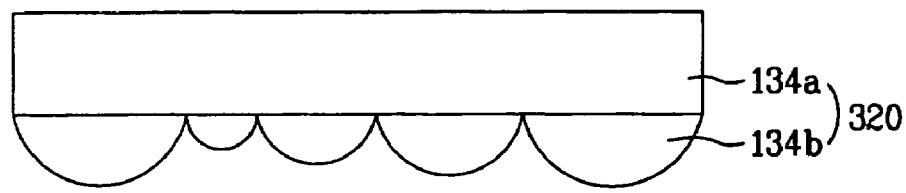

Next, referring to FIG. 32, a beam steering film 320 according to the ninth embodiment is positioned on the upper polarization plate 132 (see FIG. 16). The beam steering film 320 includes a plurality of curved-lenses formed on one surface facing the upper polarization plate 132. Specifically, the beam steering film 310 includes the planar supporting part 134a, and the ridged part 134b including the plurality of curved-lenses formed on a lower surface of the supporting part 134a, where adjacent curved-lenses of the ridged part 134b have different thicknesses and widths. In other words, two or more lens units of the ridges part 134b have different widths and thicknesses.

Further, the supporting part 134a may be integrally formed with the ridged part 134b. In addition, each curved-lens of the ridged part 134b has a convex shape and are arranged in one direction. When the adjacent curved-lenses of the ridged part 134b are formed to have different thicknesses and widths as described above, it is possible to overcome the Moire phenomenon of light.

Embodiment 10

Figure 33A:
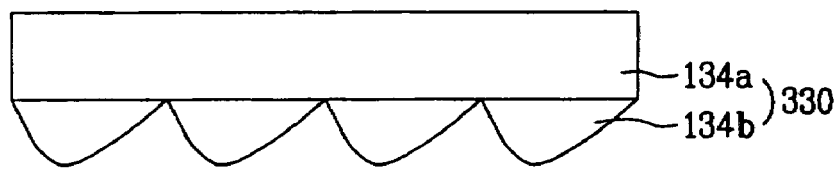
FIGS. 33A and 33B are cross-sectional views illustrating a beam steering film according to a tenth embodiment of the present invention, and a light transfer path of an LCD device having the beam steering film.
Figure 33B:
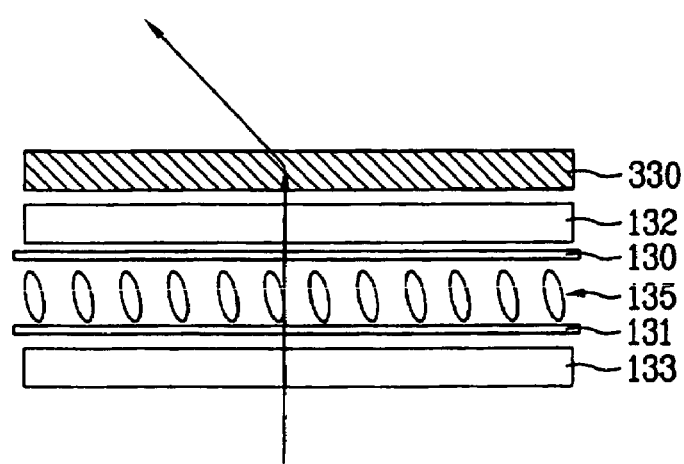

A beam steering film according to the tenth embodiment of the present invention overcomes an intermediate gray scale asymmetry in a TN mode LCD device. Referring to FIGS. 33A and 33B, the LCD device includes the upper and lower substrates 130 and 131 facing each other with the liquid crystal layer 135 interposed therebetween, the upper and lower polarization plates 132 and 133 positioned on outer surfaces of the upper and lower substrates 130 and 131, respectively, and the beam steering film 134 positioned on the upper polarization plate 132. Further, the beam steering film 134 includes a plurality of curved-lenses formed on one surface of the beam steering film 134 facing the upper polarization plate 132.

In addition, the beam steering film 134 includes the planar supporting part 134a and the ridged part 134b having the plurality of curved-lenses formed on the supporting part 134a. The supporting part 134a may be integrally formed with the ridged part 134b. Further, each curved-lens of the ridged part 134b has a convex shape and is arranged in one direction. Also, to improve a lower viewing angle by bending light downwardly, each convex lens of the ridged part 134b is asymmetrically formed such that the convex lens is further slanted toward one side of a lower portion thereof.

The LCD device according to the tenth embodiment is constructed similar to the first embodiment. In addition, note that in the first to tenth embodiments excluding the seventh embodiment, the curved-lenses of the ridged part of the beam steering film are arranged in one direction.

Embodiments 11 to 16

The beam steering films according to eleventh to sixteenth embodiments of the present invention also include ridged parts to implement a multi-domain of four domains. The LCD devices including the beam steering films according to the eleventh to sixteenth embodiments also have the same construction as the LCD device shown in FIG. 16 excluding the beam steering film. Hence, a redundant description will be omitted, and the same components will be denoted by the same reference numerals herein.

Embodiment 11

Figure 34A:
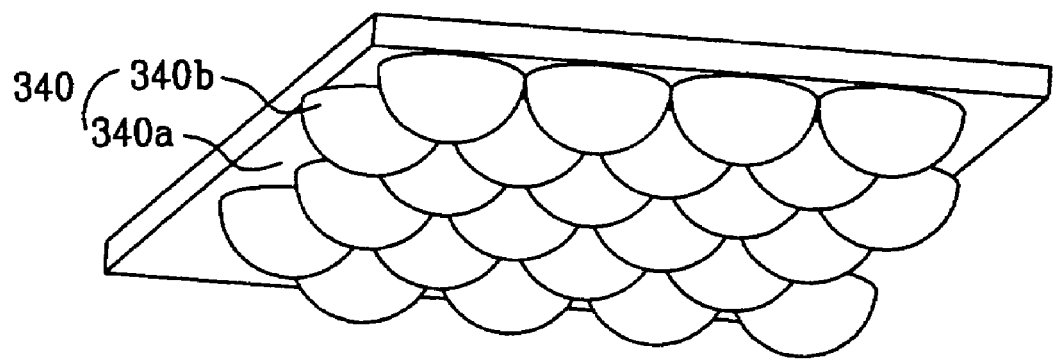
FIGS. 34A and 34B are perspective views illustrating a beam steering film according to an eleventh embodiment of the present invention.
Figure 34B:
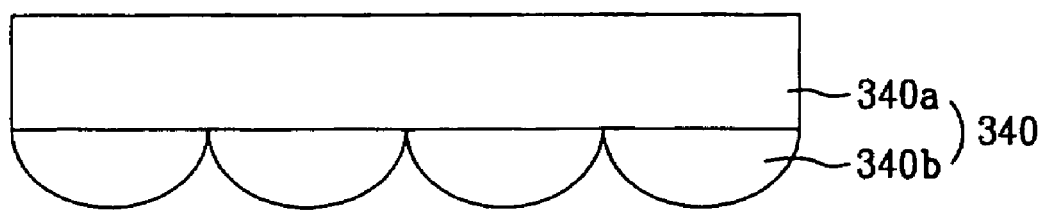

First, referring to FIGS. 34A and 34B, a beam steering film 340 according to the eleventh embodiment provides a multi-domain effect of four domains. The beam steering film 340 includes the planar supporting part 340a, and the ridged part 340b having a plurality of curved-lenses spaced from each other on the supporting part 340a. Further, the supporting part 340a may be integrally formed with the ridged part 340b. In other words, the curved-lenses of the ridged part 340b are not arranged in one direction, but separately formed.

In addition, each curved-lens of the ridged part 340b has a convexly semispherical or dome shape in an opposite direction to a light emitting side, and has a predetermined size. Although the semispherical shape of the curved-lens is most effective, the ridged part 340b may be formed as an array of lenses, each of which has a pyramid shape or a Euclidean geometry. Further, as described above in the first embodiment, the ridged part 340b of the beam steering film 340 is spaced a predetermined distance from the upper polarization plate 132 (see FIG. 16).

In other words, although not shown in the drawings, both sides of the beam steering film 340 are fixed by a fixing frame or other fixing mechanisms to prevent the beam steering film 340 from contacting the upper polarization film 132. Also, each curved-lens has a width of about 300 µm or less for 100 ppi. In addition, as the width is decreased, the lens is more effective. Here, each curved-lens has a width of not more than a length of a major axis of the LCD device.

Embodiment 12

Figure 35A:
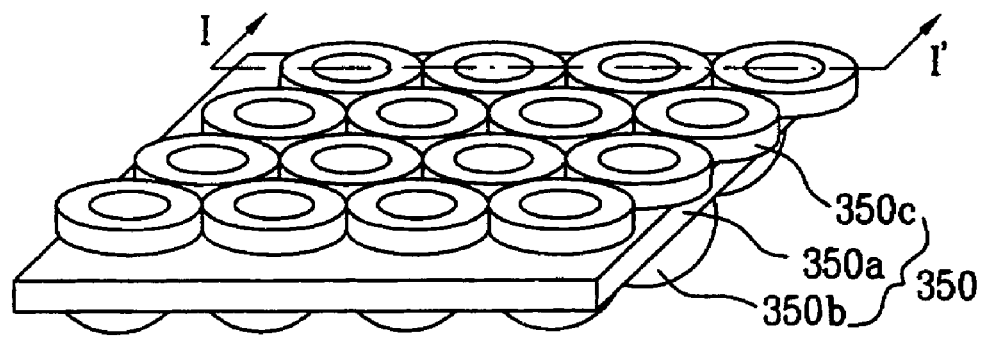
FIGS. 35A and 35B are perspective views illustrating a beam steering film according to a twelfth embodiment of the present invention.
Figure 35B:
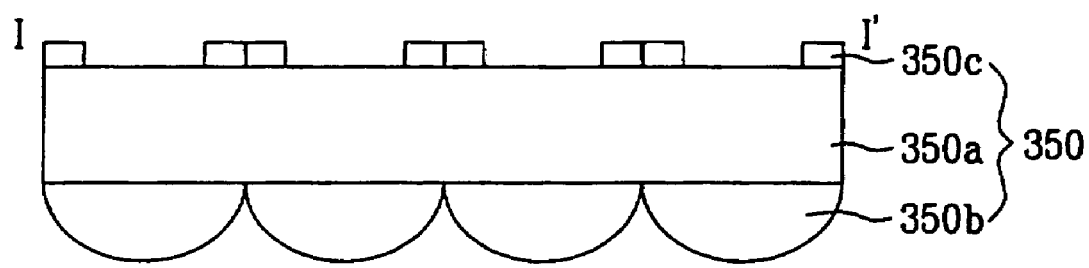

Referring to FIGS. 35A and 35B, a beam steering film 340 according to the twelfth embodiment is positioned on the upper polarization plate 132 (see FIG. 16). The beam steering film 340 includes a plurality of curved-lenses formed on one surface facing the upper polarization plate 132, and a plurality of slits 350c formed on the other surface thereof corresponding to each border between the curved-lenses to shield or reflect light.

Specifically, the beam steering film 350 includes a planar supporting part 350a, a ridged part 350b having the plurality of curved-lenses formed on a lower surface of the supporting part 350a, and a plurality of slits 350c formed on an upper surface of the supporting part 340a along each border between the curved-lenses of the ridged part 350b. In other words, the plural slits 350c are formed along each border between the curved-lenses of the ridged part 350b.

Also, the supporting part 350a may be integrally formed with the ridged part 350b. In addition, each curved-lens of the ridged part 350b has a convexly semispherical or dome shape in an opposite direction to a light emitting side, and has a predetermined size. The curved-lenses may have different widths and may have a planar section or a concave section formed therebetween. Furthermore, each of the curved-lenses may have a flat region on a surface thereof.

Although the semispherical shape is most effective, the ridged part 350b can be formed as an array of lenses, each of which has a pyramid shape or a Euclidean geometry. In addition, a width of the slit 350c is preferably less than 100% of a width of opening region of one pixel.

When the beam steering film further includes the slits 350c capable of shielding or reflecting light as described above, the LCD device can have further improved gray characteristics at the upper and lower viewing angles, and thus can have a more uniform luminance.

Embodiments 13 to 15

Figure 36:
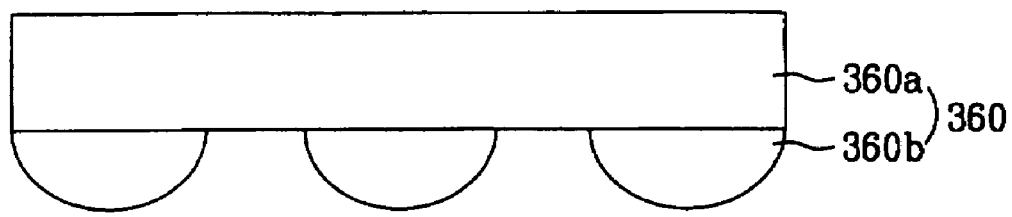
FIGS. 36 to 38 are perspective views illustrating beam steering films according to thirteenth to sixteenth embodiments of the present invention.

The beam steering films according to the thirteenth to fifteenth embodiments of the present invention overcome a luminance deterioration in the front side of an LCD device. First, referring to FIG. 36, a beam steering film 360 according to the thirteenth embodiment is positioned on the upper polarization plate 132 (see FIG. 16). The beam steering film 360 includes a plurality of curved-lenses formed on one surface facing the upper polarization plate 132, and is planar between the curved-lenses.

Specifically, the beam steering film 360 includes a supporting part 360a having a predetermined thickness, and a ridged part 360b having the plurality of curved-lenses formed on a lower surface of the supporting part 360a with a planar section formed between the curved-lens shapes. Each of the curved-lenses of the ridged part 360b has a convex lens shape.

Also, the supporting part 360a may be integrally formed with the ridged part 360b. When the beam steering film 360 is planar between the curved-lens shapes of the ridged part 350b as described above, such a planar section improves the luminance in the front side of the LCD device because light propagates straightly without being bent on this section.

Figure 37:
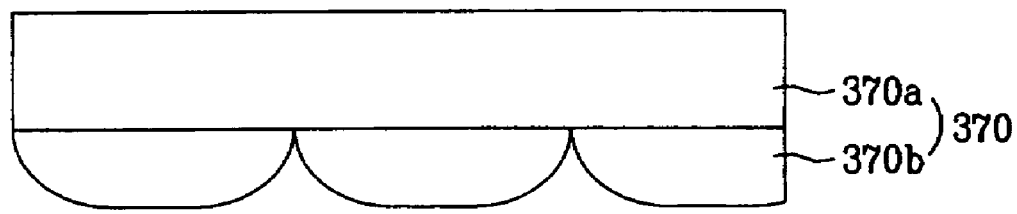

Next, referring to FIG. 37, a beam steering film 370 according to the fourteenth embodiment is positioned on the upper polarization plate 132 (see FIG. 16). The beam steering film 370 includes a plurality of curved-lenses formed on one surface facing the upper polarization plate 132, where each of the curved-lenses has a flat central region. Specifically, the beam steering film 370 includes a supporting part 370a having a predetermined thickness, and a ridged part 370b having the plurality of curved-lenses formed on a lower surface of the supporting part 370a, where each of the curved-lenses of the ridged part 370b has the flat central region.

In addition, each of the curved-lenses of the ridged part 370b has a convex lens shape. The supporting part 370a may also be integrally formed with the ridged part 370b. When flat regions are formed on the ridged part 370b as described above, these regions improve the luminance in the front side of the LCD device because light propagates straightly without being bent on these regions.

Figure 38:
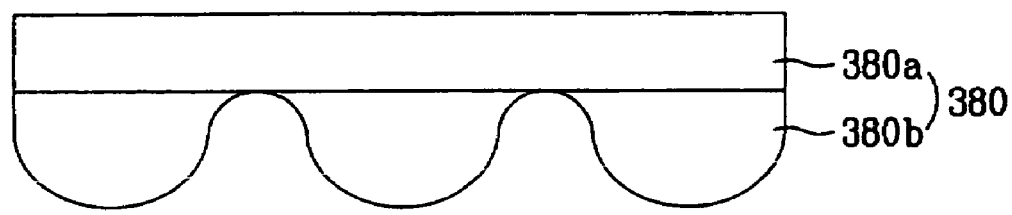

Next, referring to FIG. 38, a beam steering film 380 according to the fifteenth embodiment is positioned on the upper polarization plate 132 (see FIG. 16). The beam steering film 380 includes a plurality of curved-lenses formed on one surface facing the upper polarization plate 132, and a plurality of concave lenses, each of which is formed between the curved-lenses.

Specifically, the beam steering film 380 includes a supporting part 380a having a predetermined thickness, and a ridged part 380b having the plurality of curved-lenses formed on a lower surface of the supporting part 380a. Further, the plurality of curved-lenses of the ridged part 380b include a plurality of convex lenses and a plurality of concave lenses, each of which is formed between the convex lenses. The supporting part 134a may also be integrally formed with the ridged part 134b. Thus, when a concave lens is formed in each space between the convex lenses of the ridged part 380b, the luminance in the front side of the LCD device is improved.

Embodiment 16

Figure 39A:
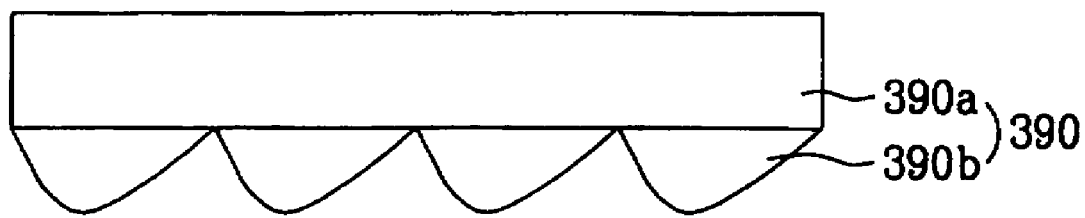
FIGS. 39A and 39B are cross-sectional views illustrating a beam steering film according to a seventh embodiment of the present invention, and a light transfer path of an LCD device comprising the beam steering film.
Figure 39B:
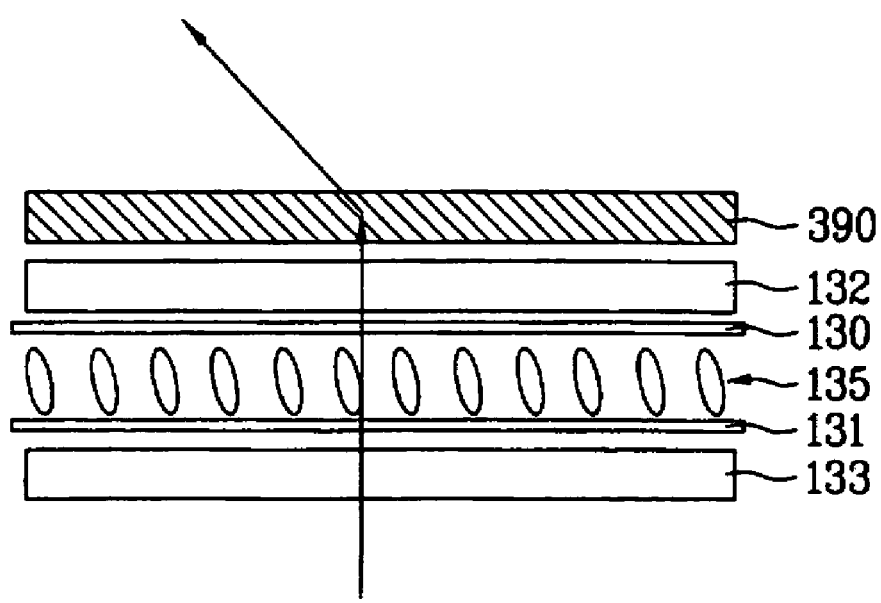

A beam steering film according to the sixteenth embodiment of the present invention overcome an intermediate gray scale asymmetry in a TN mode LCD device. Referring to FIGS. 39A and 39B, an LCD device including the beam steering film according to the sixteenth embodiment has upper and lower substrates 130 and 131 facing each other with a liquid crystal layer 135 interposed therebetween, upper and lower polarization plates 132 and 133 positioned on outer surfaces of the upper and lower substrates 130 and 131, respectively, and a beam steering film 390 positioned on the upper polarization plate 132.

The beam steering film 390 includes a plurality of asymmetrical curved-lenses formed on one surface of the beam steering film 390 to face the upper polarization plate 132. Further, the beam steering film 390 includes a planar supporting part 390a and a ridged part 390b having the plurality of asymmetrical curved-lens formed on the supporting part 390a. The supporting part 390a may also be integrally formed with the ridged part 390b.

In addition, each of the curved-lenses of the ridged part 390b has a convex shape. To improve a lower viewing angle by bending light downwardly, each convex lens of the ridged part 134b is asymmetrically formed such that the convex lens is further slanted toward one side of a lower portion thereof.

The LCD device according to the present invention constructed as above has advantageous effects as follows. The LCD device is provided on an uppermost surface thereof with a beam steering film which has curved-lenses formed thereon, solving problems such as luminance deterioration, gray inversion, contrast deterioration, and color shift at upper and lower viewing angles.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
upper and lower substrates facing each other with a liquid crystal layer interposed therebetween;
upper and lower polarization plates positioned on outer surfaces of the upper and lower substrates, respectively; and
a beam steering film positioned on the upper polarization plate,
wherein the beam steering film further comprises a plurality of scattering layers to provide a Haze property, a plurality of randomly arranged supporting parts positioned on a lower surface of the plurality of scattering layers, and a plurality of ridged parts positioned on a lower surface of each of the plurality of randomly arranged supporting parts and having a plurality of curved lenses facing the upper polarization plate, and
wherein the beam steering film is randomly arranged instead of being arranged linearly.

2. The LCD device according to claim 1, wherein curved lenses have an equal width.

3. The LCD device according to claim 1, wherein each curved lens has a convex shape.

4. The LCD device according to claim 1, wherein the curved lenses are spaced a predetermined distance from the upper polarization plate.

5. The LCD device according to claim 1, further comprising:
a fixing mechanism configured to fix both sides of the beam steering film to prevent the beam steering film from contacting the upper polarization film.

6. The LCD device according to claim 1, wherein each curved lens has a width of about 300 μm or less for 100 ppi.

7. The LCD device according to claim 1, the plurality of ridged parts has each of the curved lenses spaced a predetermined distance from each other and arranged in one direction on a lower surface of the supporting part.

8. The LCD device according to claim 1, wherein two or more of each of the curved lenses have different thicknesses and widths from each other.

9. The LCD device according to claim 1, wherein each of the curved lenses has an asymmetrical shape.

10. The LCD device according to claim 9, wherein each of the curved-lenses of the ridged part is slanted toward one side of a lower portion of the curved-lens of the ridged part.

11. The LCD device according to claim 1, wherein the beam steering film comprises at least one of polymethylmethacrylate (PMMA), vinyl chloride, acrylic resins, polycarbonate (PC), polyethylene therephtalate (PET), polyethylene (PE), polystyrene (PS), polypropylene (PP), polyimide (PI), glass and silica, or a combination thereof.

* * * * *